(12) United States Patent
Spanks

(10) Patent No.: US 10,143,266 B2
(45) Date of Patent: Dec. 4, 2018

(54) ARTICLE OF FOOTWEAR WITH A LATTICE SOLE STRUCTURE

(71) Applicant: NIKE, Inc., Beaverton, OR (US)

(72) Inventor: Jeffrey C. Spanks, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 108 days.

(21) Appl. No.: 14/630,827

(22) Filed: Feb. 25, 2015

(65) Prior Publication Data

US 2016/0242502 A1    Aug. 25, 2016

(51) Int. Cl.
  *A43B 13/20* (2006.01)
  *A43B 13/18* (2006.01)
  *B33Y 80/00* (2015.01)

(52) U.S. Cl.
  CPC ............ *A43B 13/20* (2013.01); *A43B 13/181* (2013.01); *B33Y 80/00* (2014.12)

(58) Field of Classification Search
  CPC ....... A43B 13/226; A43B 13/24; A43B 13/26; A43B 13/145; A43B 13/189; A43B 13/20; A43B 13/206
  See application file for complete search history.

(56) References Cited

U.S. PATENT DOCUMENTS

| 4,133,118 A * | 1/1979 | Khalsa | A43B 7/14 36/29 |
| 4,183,156 A | 1/1980 | Rudy | |
| 4,219,945 A | 9/1980 | Rudy | |
| 4,297,796 A * | 11/1981 | Stirtz | A43B 13/18 36/28 |
| 4,535,553 A * | 8/1985 | Derderian | A43B 13/181 36/28 |
| 4,831,749 A * | 5/1989 | Tsai | A43B 17/08 36/141 |
| 4,845,863 A * | 7/1989 | Yung-Mao | A43B 1/0072 36/114 |
| 4,887,367 A * | 12/1989 | Mackness | A43B 13/203 36/129 |
| 4,972,611 A * | 11/1990 | Swartz | A43B 13/187 36/114 |
| 5,150,490 A * | 9/1992 | Busch | A43B 17/14 12/146 M |

(Continued)

FOREIGN PATENT DOCUMENTS

| CN | 1053884 A | 8/1991 | |
| EP | 0185781 A1 * | 7/1986 | ............. A43B 7/146 |

(Continued)

OTHER PUBLICATIONS

International Search Report and Written Opinion dated Jun. 24, 2016 for PCT Application No. PCT/US2016/018499.

*Primary Examiner* — Megan Lynch
(74) *Attorney, Agent, or Firm* — Honigman Miller Schwartz and Cohn LLP; Matthew H. Szalach; Jonathan P. O'Brien

(57) ABSTRACT

An article of footwear includes an upper and a sole structure. The sole structure can be manufactured using a customized cushioning sole system. A user's foot morphology and/or preferences may be used to design the sole structure. The sole structure can also include a lattice structure made by a three-dimensional printer. The sole structure includes compartments to receive air bladder components.

12 Claims, 16 Drawing Sheets

(56) References Cited

U.S. PATENT DOCUMENTS

| | | | | |
|---|---|---|---|---|
| 5,337,492 | A * | 8/1994 | Anderie | A43B 13/183 36/114 |
| 5,493,791 | A * | 2/1996 | Kramer | A43B 7/081 36/28 |
| 5,518,802 | A | 5/1996 | Colvin et al. | |
| 5,564,202 | A | 10/1996 | Hoppenstein | |
| 5,655,314 | A * | 8/1997 | Petracci | A43B 7/081 36/3 B |
| 5,713,141 | A | 2/1998 | Mitchell et al. | |
| 5,853,844 | A * | 12/1998 | Wen | A43B 13/181 36/114 |
| 5,894,687 | A * | 4/1999 | Lin | A43B 7/146 36/141 |
| 5,952,065 | A | 9/1999 | Mitchell et al. | |
| 6,082,025 | A | 7/2000 | Bonk et al. | |
| 6,115,943 | A * | 9/2000 | Gyr | A43B 13/141 36/28 |
| 6,127,026 | A | 10/2000 | Bonk et al. | |
| 6,397,498 | B1 * | 6/2002 | Yoo | A43B 3/0031 36/103 |
| 6,763,611 | B1 * | 7/2004 | Fusco | A43B 13/125 36/25 R |
| 6,769,202 | B1 * | 8/2004 | Luthi | A43B 13/184 36/28 |
| 6,775,926 | B1 * | 8/2004 | Huang | A43B 7/081 36/3 B |
| 7,032,328 | B2 | 4/2006 | Wilson et al. | |
| 7,207,125 | B2 * | 4/2007 | Jeppesen | A43B 1/0072 36/30 R |
| 7,930,839 | B2 | 4/2011 | Litchfield et al. | |
| 8,522,454 | B2 | 9/2013 | Schindler et al. | |
| 8,650,690 | B2 | 2/2014 | Ungari et al. | |
| 9,192,205 | B2 * | 11/2015 | McDowell | A43B 3/108 |
| 2001/0008053 | A1 | 7/2001 | Belli | |
| 2002/0050075 | A1 * | 5/2002 | Moretti | A43B 7/08 36/3 R |
| 2002/0050077 | A1 * | 5/2002 | Wang | A43B 1/0072 36/28 |
| 2004/0221484 | A1 * | 11/2004 | Wang | A43B 17/02 36/29 |
| 2005/0268490 | A1 * | 12/2005 | Foxen | A43B 7/1425 36/28 |
| 2005/0268491 | A1 * | 12/2005 | McDonald | A43B 1/0063 36/28 |
| 2006/0096125 | A1 * | 5/2006 | Yen | A43B 3/0063 36/35 B |
| 2006/0156579 | A1 * | 7/2006 | Hoffer | A43B 1/0009 36/28 |
| 2007/0063368 | A1 | 3/2007 | Schindler | |
| 2007/0113425 | A1 * | 5/2007 | Wakley | A43B 13/20 36/28 |
| 2007/0227041 | A1 * | 10/2007 | Menghini | A43B 13/20 36/28 |
| 2007/0266593 | A1 * | 11/2007 | Schindler | A43B 1/0009 36/28 |
| 2008/0028642 | A1 * | 2/2008 | Kim | A43B 7/06 36/140 |
| 2009/0056171 | A1 * | 3/2009 | Lin | A43B 7/146 36/3 B |
| 2009/0094858 | A1 * | 4/2009 | Ungari | B29C 47/30 36/88 |
| 2009/0126225 | A1 * | 5/2009 | Jarvis | A43B 13/41 36/29 |
| 2009/0183392 | A1 * | 7/2009 | Shane | A43B 1/0027 36/97 |
| 2010/0101111 | A1 * | 4/2010 | McDonnell | A43B 1/0054 36/29 |
| 2010/0205716 | A1 * | 8/2010 | Kim | A41D 31/005 2/69 |
| 2011/0131832 | A1 * | 6/2011 | Brandt | A43B 13/20 36/29 |
| 2011/0162240 | A1 * | 7/2011 | Pieri | A43B 7/082 36/3 B |
| 2011/0277346 | A1 * | 11/2011 | Peyton | A43B 13/20 36/29 |
| 2011/0277349 | A1 * | 11/2011 | Kim | A43B 3/0005 36/84 |
| 2012/0102783 | A1 * | 5/2012 | Swigart | A43B 13/206 36/83 |
| 2012/0144695 | A1 * | 6/2012 | McDowell | A43B 13/122 36/28 |
| 2013/0212909 | A1 * | 8/2013 | Bates | A43B 13/189 36/102 |
| 2013/0258085 | A1 | 10/2013 | Leedy et al. | |
| 2014/0109441 | A1 * | 4/2014 | McDowell | A43B 7/085 36/103 |
| 2014/0182170 | A1 * | 7/2014 | Wawrousek | A43B 7/14 36/103 |
| 2014/0196308 | A1 * | 7/2014 | Baratta | A43B 13/184 36/29 |
| 2014/0259742 | A1 * | 9/2014 | Wu | A43B 13/181 36/28 |
| 2014/0259743 | A1 * | 9/2014 | Bernhard | A43B 13/181 36/28 |
| 2014/0259787 | A1 * | 9/2014 | Guyan | A43B 13/127 36/103 |
| 2014/0283413 | A1 * | 9/2014 | Christensen | A43B 3/0057 36/102 |
| 2015/0040428 | A1 * | 2/2015 | Davis | A43B 13/14 36/83 |
| 2015/0128448 | A1 * | 5/2015 | Lockyer | A43B 7/1415 36/28 |
| 2015/0196082 | A1 * | 7/2015 | Van Atta | A43B 7/00 36/103 |
| 2015/0272270 | A1 * | 10/2015 | Im | A43B 7/088 36/29 |
| 2015/0313312 | A1 * | 11/2015 | Park | A43B 13/16 36/31 |
| 2015/0351493 | A1 * | 12/2015 | Ashcroft | A43B 5/02 36/132 |
| 2016/0051009 | A1 * | 2/2016 | Kormann | A43B 13/14 36/103 |
| 2016/0113352 | A1 * | 4/2016 | Guyan | A43B 13/127 12/146 B |
| 2016/0122493 | A1 * | 5/2016 | Farris | A43B 13/125 521/82 |

FOREIGN PATENT DOCUMENTS

| | | | | |
|---|---|---|---|---|
| GB | 2203025 A | * | 10/1988 | A43B 13/203 |
| KR | 100825008 | | 4/2008 | |
| WO | 2006031003 | | 3/2006 | |
| WO | 2013171339 | | 11/2013 | |
| WO | 2014/100462 A1 | | 6/2014 | |

* cited by examiner

ARTICLE OF FOOTWEAR WITH A LATTICE SOLE STRUCTURE

BACKGROUND

The present embodiments relate generally to articles of footwear, and in particular to articles with cushioning provisions and methods of making such articles.

Articles of footwear generally include two primary elements: an upper and a sole structure. The upper is often formed from a plurality of material elements (e.g., textiles, polymer sheet layers, foam layers, leather, synthetic leather) that are stitched or adhesively bonded together to form a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust fit of the footwear, as well as permitting entry and removal of the foot from the void within the upper. In addition, the upper may include a tongue that extends under the lacing system to enhance adjustability and comfort of the footwear, and the upper may incorporate a heel counter.

The sole structure is secured to a lower portion of the upper so as to be positioned between the foot and the ground. In athletic footwear, for example, the sole structure includes a midsole and an outsole. The midsole may be formed from a polymer foam material that attenuates ground reaction forces (i.e., provides cushioning) during walking, running, and other ambulatory activities. The midsole may also include fluid-filled chambers, plates, moderators, or other elements that further attenuate forces, enhance stability, or influence the motions of the foot, for example. The outsole forms a ground-contacting element of the footwear and is usually fashioned from a durable and wear-resistant rubber material that includes texturing to impart traction. The sole structure may also include a sockliner positioned within the upper and proximal a lower surface of the foot to enhance footwear comfort.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

In one aspect, the present disclosure is directed to a customized cushioning sole system for an article of footwear. The system includes a sole structure with a lattice structure, where the lattice structure has an upper side. The upper side is has a geometry corresponding to the contours of a foot. The lattice structure has a plurality of interstices, where the plurality of interstices includes a first interstice. The upper side further includes a first aperture that is proximate to the first interstice. The first aperture is also in fluid communication with the first interstice. The first interstice contains a first air bladder component.

In another aspect, the present disclosure is directed to an article of footwear including a customized sole structure. The customized sole structure includes an upper side, a bottom side, a peripheral side, and a plurality of interstices. The upper side further includes a plurality of apertures. The upper side includes contours that correspond to the contours of a sole of a wearer's foot. The custom lattice structure also includes a plurality of air bladder components, including a first air bladder component, an interior area bounded by the upper side, the bottom side, and the peripheral side, where the interior area contains the plurality of interstices. The plurality of interstices includes a first interstice, wherein the first interstice includes the first air bladder component.

In another aspect, the present disclosure is directed to a method for customizing a cushioning sole system for an article of footwear. The method comprises: receiving information about the geometry of a wearer's foot; forming a lattice, where the lattice has an upper side, and where the upper side is customized according to the information received about the geometry of the wearer's foot. Furthermore, a plurality of air bladder components are incorporated in the lattice.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

Figure 1:
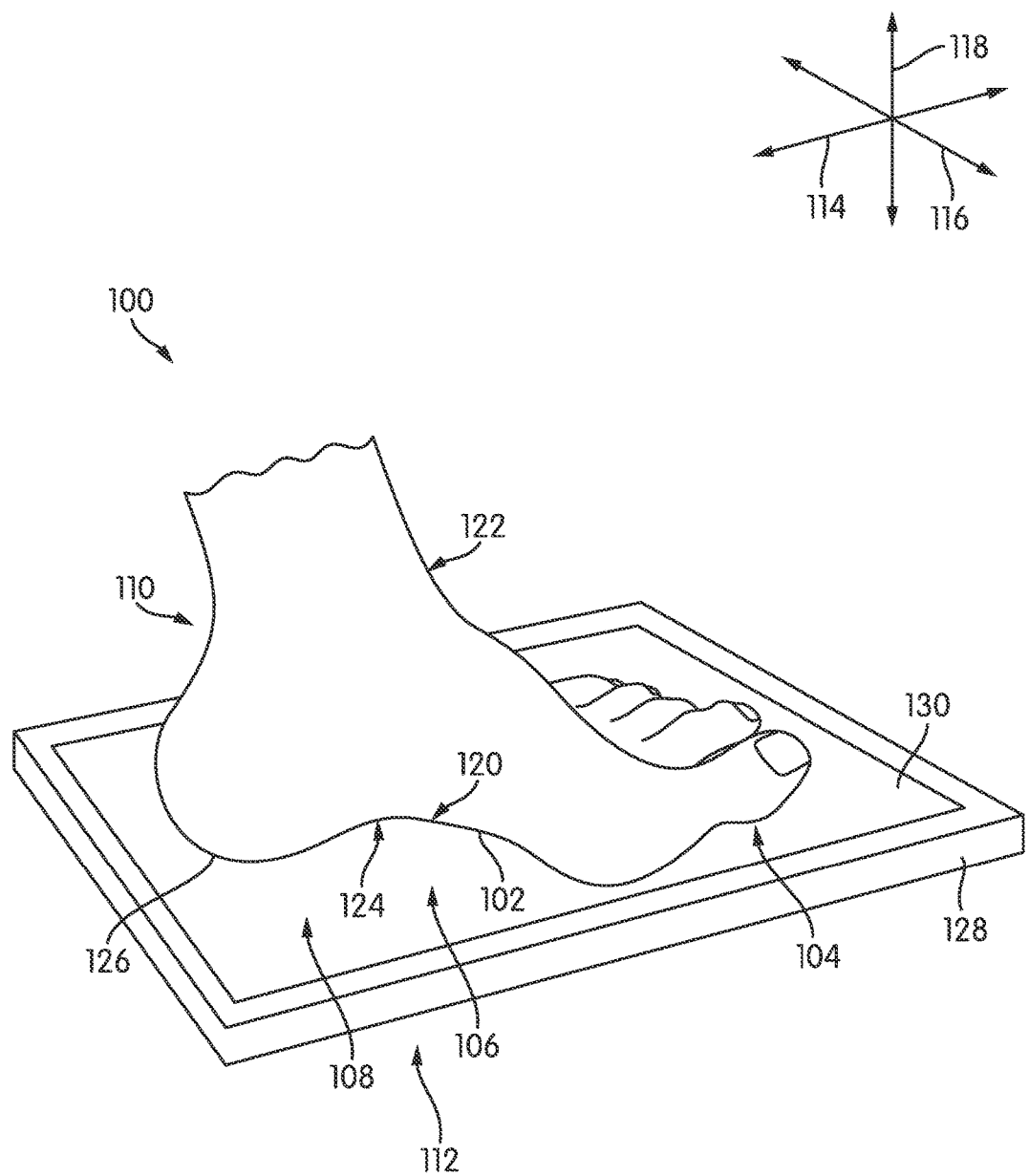
FIG. 1 illustrates an embodiment of the use of a device for obtaining three dimensional foot data.

FIGS. 1-4 depict an embodiment of a method of designing a customized sole structure for an article of footwear. FIG. 1 shows the three-dimensional shape of a plantar surface 102 of a person's foot 100 being measured using a data collection apparatus 128.

For purposes of reference, foot 100, components associated with foot 100, and/or representations of foot 100 (such as an article of footwear, an upper, a sole structure, a computer aided design of foot 100, and other components/representations) may be divided into different regions. Foot 100 may include a forefoot region 104, a midfoot region 106 and a heel region 108. Forefoot region 104 may be generally associated with the toes and joints connecting the metatarsals with the phalanges. Midfoot region 106 may be generally associated with the metatarsals of a foot. Heel region 108 may be generally associated with the heel of a foot, including the calcaneus bone. In addition, foot 100 may include a lateral side 110 and a medial side 112. In particular, lateral side 110 and medial side 112 may be associated with opposing sides of foot 100. Furthermore, both lateral side 110 and medial side 112 may extend through forefoot region 104, midfoot region 106, and heel region 108. It will be understood that forefoot region 104, midfoot region 106, and heel region 108 are only intended for purposes of description and are not intended to demarcate precise regions of foot 100. Likewise, lateral side 110 and medial side 112 are intended to represent generally two sides of foot 100, rather than precisely demarcating foot 100 into two halves.

For consistency and convenience, directional adjectives are also employed throughout this detailed description corresponding to the illustrated embodiments. The term "lateral" or a "lateral direction" 116 as used throughout this detailed description and in the claims refers to a direction extending along a width of a component. For example, lateral direction 116 of foot 100 may extend between medial side 112 and lateral side 110 of foot 100. Additionally, the term "longitudinal" or a "longitudinal direction" 114 as used throughout this detailed description and in the claims refers to a direction extending a length of a footwear part or foot 100. In some embodiments, longitudinal direction 114 may extend from forefoot region 104 to heel region 108 of foot 100. As noted earlier, it will be understood that each of these directional adjectives may also be applied to individual components of an article of footwear, such as an upper and/or a sole structure. A vertical direction 118 refers to the direction perpendicular to a horizontal surface defined by longitudinal direction 114 and lateral direction 116.

Figure 2:
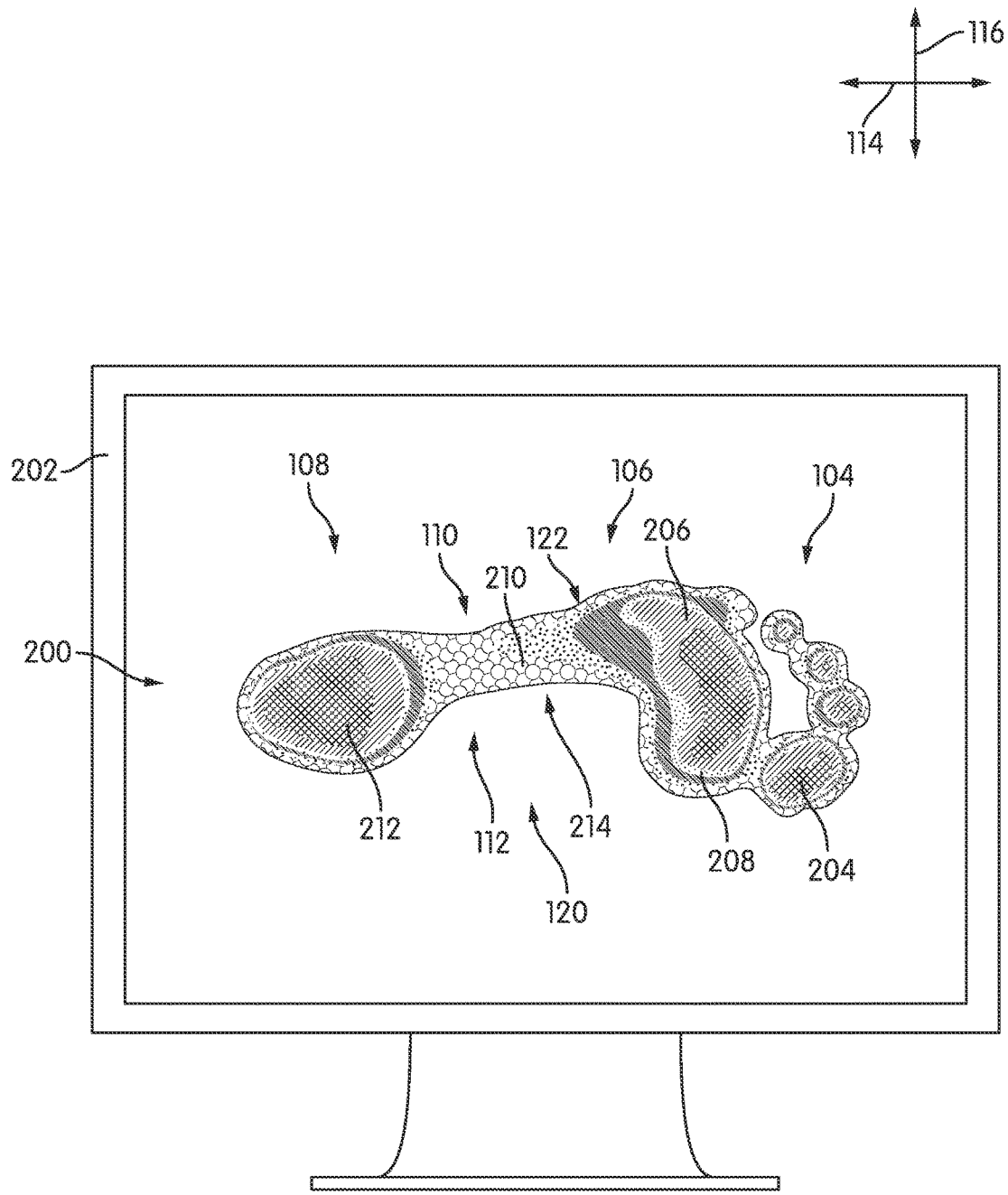
FIG. 2 schematically illustrates an embodiment of a computer screen image of digitized three-dimensional foot data.

Furthermore, foot 100 may include a medial arch area 120, associated with an upward curve along medial side 112 of midfoot region 106, and a lateral arch area 122, associated with an upward curve along lateral side 110 of midfoot region 106. The region corresponding to lateral arch area 122 is best seen in FIG. 2, which illustrates a computer screen image of digitized three-dimensional foot data. As described below, the curvature of medial arch area 120 and lateral arch area 122 may vary from one foot to another. In addition, foot 100 includes a transverse arch 124 that extends in lateral direction 116 near forefoot region 104 along plantar surface 102. Foot 100 also includes a heel prominence 126, which is the prominence located in heel region 108 of foot 100. As shown in FIG. 1, foot 100 is illustrated as a left foot; however, it should be understood that the following description may equally apply to a mirror image of a foot or, in other words, a right foot.

Although the embodiments throughout this detailed description depict components configured for use in athletic articles of footwear, in other embodiments the components may be configured to be used for various other kinds of footwear including, but not limited to: hiking boots, soccer shoes, football shoes, sneakers, running shoes, cross-training shoes, rugby shoes, basketball shoes, baseball shoes as well as other kinds of shoes. Moreover, in some embodiments, components may be configured for various kinds of non-sports related footwear, including, but not limited to: slippers, sandals, high heeled footwear, loafers as well as any other kinds of footwear.

Components associated with an article of footwear are generally made to fit various sizes of feet. In the embodiments shown, the various articles are configured with approximately the same footwear size. In different embodiments, the components could be configured with any footwear sizes, including any conventional sizes for footwear known in the art. In some embodiments, an article of footwear may be designed to fit the feet of a child. In other embodiments, an article of footwear may be designed to fit the feet of an adult. Still, in other embodiments, an article of footwear may be designed to fit the feet of a man or a woman.

Referring to FIGS. 1 and 2, a first step of the present method is to collect data related to foot 100, such as using a barefoot pressure measurement or other data, from the person being measured on data collection apparatus 128. Data collection apparatus 128 may include provisions for capturing information about an individual's feet. Specifically, in some embodiments, data collection apparatus 128 may include provisions to capture geometric information about one or more feet. This geometric information can include size (e.g., length, width and/or height) as well as three-dimensional information corresponding to the customer's feet (e.g., forefoot geometry, midfoot geometry, heel geometry and ankle geometry). In at least one embodiment, the captured geometric information for a customer's foot can be used to generate a three-dimensional model of the foot for use in later stages of manufacturing. In particular, the customized foot information can include at least the width and length of the foot. In some cases, the customized foot information may include information about the three-dimensional foot geometry. Customized foot information can be used to create a three-dimensional model of the foot. Embodiments may include any other provisions for capturing customized foot information. The present embodiments could make use of any of the methods and systems for forming an upper disclosed in Bruce, U.S. patent application Ser. No. 14/565,582, filed Dec. 10, 2014, and titled "Portable Manufacturing System for Articles of Footwear" the entirety of which is herein incorporated by reference. Some embodiments could use any of the systems, devices and methods for imaging a foot as disclosed in Gregory et al., U.S. Patent Publication Number 2013/0258085, published Oct. 3, 2013 and titled "Foot Imaging and Measurement Apparatus," the entirety of which is herein incorporated by reference.

In FIG. 2, a screen 202 displays a scan 200 of plantar pressure distributions for foot 100. Scan 200 may provide a measured foot image with various distinct regions to indicate the pressure applied by foot 100 along plantar surface 102, including a first plantar pressure area 204, a second plantar pressure area 206, a third plantar pressure area 208, a fourth plantar pressure area 210, and a fifth plantar pressure area 212. An additional plantar pressure area 214 is indicated where plantar surface 102 did not make an impressionable contact with surface 130 of data collection apparatus 128. In some embodiments, colors (not shown in FIG. 2) can be included in scan 200 to more readily distinguish variations within the measured pressure data. It should be noted that in other embodiments, different, fewer, or more plantar pressure areas may be measured or indicated.

As seen in FIG. 2, in some embodiments, the data collected may include scan 200 of foot 100. In some embodiments, scan 200 may be used to assess the three-dimensional shape and obtain digital data in a two-dimensional or a three-dimensional reference frame. In other embodiments, scan 200 can provide a baseline shape for a footwear component. In one embodiment, three-dimensional scanned images may be used to measure the overall shape of a person's feet, and obtain two-dimensional measurements such as an outline, length, and width of foot 100. Obtaining foot geometry can establish a baseline record for the person in one embodiment. In some embodiments, other input may also be provided to supplement information regarding the person being measured. In different embodiments, additional data such as toe height information may also be obtained. In other embodiments, plaster casts of a person's foot may be taken and digitized. Additionally, other digital or imaging techniques which may be employed to capture two and three-dimensional foot shape and profile can be used to construct and/or supplement scan 200. In other embodiments, the person seeking a measurement of foot 100 may provide answers to questions describing the person's physical characteristics, limitations and personal lifestyle, which may impact design of the various parts described herein.

Figure 3:
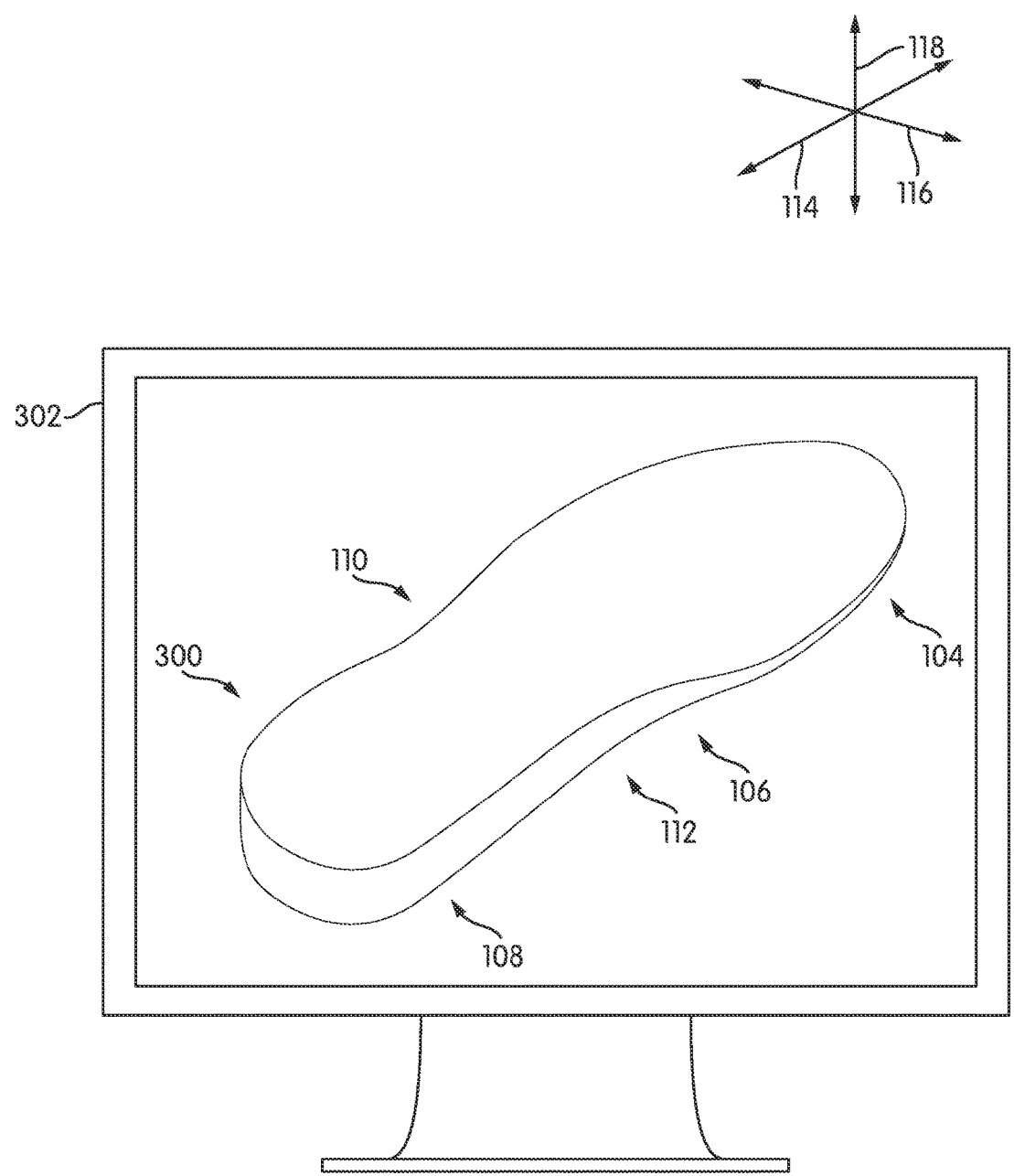
FIG. 3 schematically illustrates an embodiment of a computer screen image of a template for a sole structure.

A sole structure may provide one or more functions for an article of footwear. In FIG. 3, an image of a template of a sole structure 300 is displayed on a screen 302. In some embodiments, sole structure 300 may attenuate ground reaction forces when compressed between the foot and the ground during walking, running or other ambulatory activities. The configuration of sole structure 300 may vary significantly in different embodiments to include a variety of conventional or non-conventional structures. In some cases, the configuration of sole structure 300 can be selected or customized according to one or more types of ground surfaces on which sole structure 300 may be used. Examples of ground surfaces include, but are not limited to: natural turf, synthetic turf, dirt, as well as other surfaces.

Figure 4:
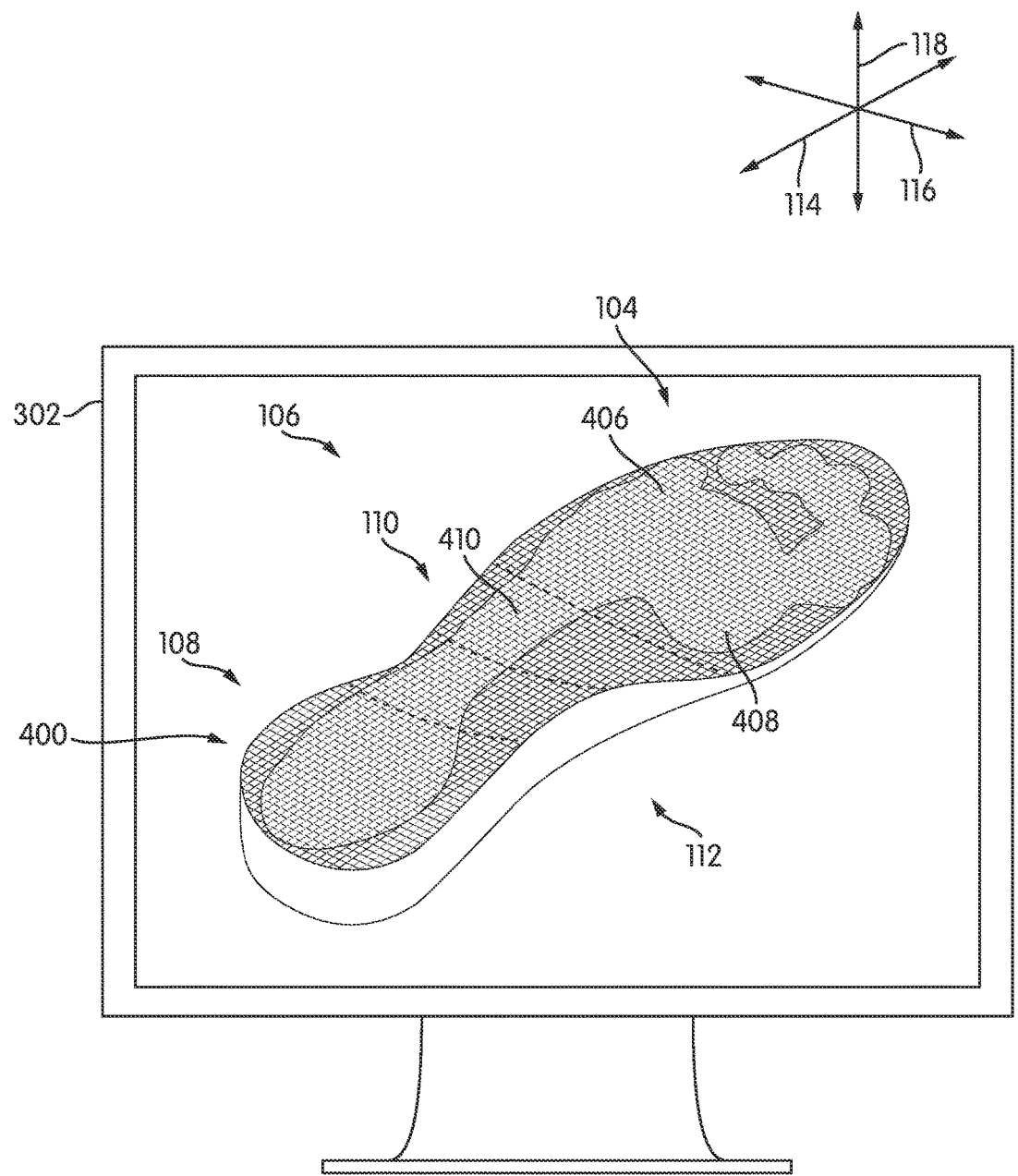
FIG. 4 schematically illustrates an embodiment of a computer screen image of a digitized model of a customized sole structure.

Upon obtaining measurements of foot 100, sole structure 300 may be adjusted or altered in different embodiments. As seen in FIG. 4, using the data collected from the steps above, a custom sole structure 400 may be further designed. In some embodiments, the design may utilize an application of an integrated computer aided design such as a computer automated manufacturing (CAD-CAM) process. Sole structure 300, or any other template previously selected, may be provided as an input to the computer design program. In one embodiment, the three dimensional foot shape data from scan 200 is also provided to the program.

In different embodiments, scan 200 may provide information regarding foot shape and pressure to allow appropriate fit within the article of footwear. The information may be used to form custom sole structure 400. In some embodiments, data from scan 200 may be superimposed onto a template of sole structure 300. For example, there may be a process of aligning the data representing the plantar pressures of foot 100 with sole structure 300 and generating a partial or complete design of a custom sole structure 400. In one embodiment, pressure contour lines 406 may be formed during design of custom sole structure 400. The pressure distribution may be adjusted to a 'best-fit' position based upon user input in some embodiments. In one embodiment, after the plantar pressure distribution comprising pressure contour lines 406 is aligned with the template of sole structure 300, the aligned data may be applied to production of custom sole structure 400.

In different embodiments, sole structure 400 may include various modifications. Modifications may include contours forming elevations 408, depressions 410, openings, and/or combinations of both elevations 408 and depressions 410. Customized modifications may provide individual users with a wider range of comfort and fit. For example, different users may have differences in the height of the arch of foot 100. As described above, foot 100 may include multiple arches. Generally, the arch is a raised curve on the bottom surface of foot 100. When the tendons of foot 100 pull a normal amount, foot 100 generally forms a moderate or normal arch. However, when tendons do not pull together properly, there may be little or no arch. This is called "flat foot" or fallen arch. Over-pronation of a foot may be common for those with flat feet. The framework of a foot can collapse, causing the foot to flatten and adding stress to other parts of the foot. Individuals with flat feet may need orthotics to control the flattening of the foot. Moreover, the opposite may also occur, though high foot arches are less common than flat feet. Without adequate support, highly arched feet tend to be painful because more stress is placed on the section of the foot between the ankle and toes. This condition can make it difficult to fit into shoes. Individuals who have high arches usually need foot support. It should be noted that such variations in arch height are one of many possible examples of customized foot geometry that may be incorporated into a design.

Figure 5:
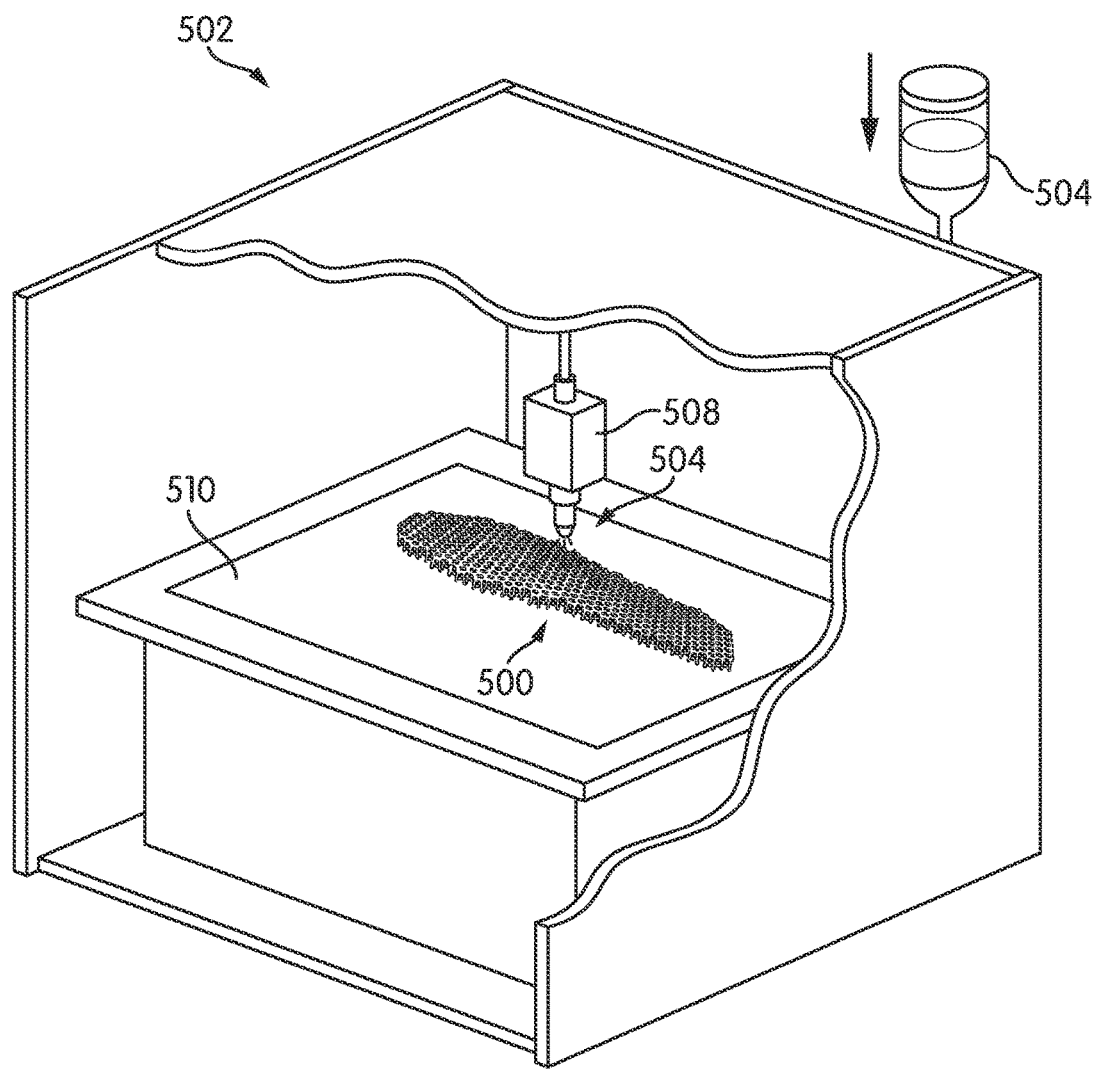
FIG. 5 illustrates an embodiment of a three-dimensional printer and a method of printing a sole structure.

Once a design has been generated, as with custom sole structure 400, the sole structure may be manufactured. In FIG. 5, a custom sole structure 500 is being made from a print substance dispersed by a three-dimensional printer 502. Generally, custom sole structure 500 may comprise any type of sole layer. In particular, custom sole structure 500 may have any design, shape, size and/or color. For example, in embodiments where an article of footwear is a basketball shoe, custom sole structure 500 could include contours shaped to provide greater support to heel prominence 126, as shown in FIG. 1. In embodiments where the article of footwear is a running shoe, custom sole structure 500 could be configured with contours supporting forefoot region 104. In some embodiments, custom sole structure 500 could further include provisions for fastening to an upper or another sole layer, and may include still other provisions found in footwear sole structures. Also, some embodiments of custom sole structure 500 may include other materials disposed within custom sole structure 500, such as air bladders, leather, synthetic materials (such as plastic or synthetic leather), mesh, foam, or a combination thereon.

The material selected for custom sole structure 500 may possess sufficient durability to withstand the repetitive compressive and bending forces that are generated during running or other athletic activities. In some embodiments, the material(s) may include polymers such as urethane or nylon; resins; metals such as aluminum, titanium, stainless steel, or lightweight alloys; or composite materials that combine carbon or glass fibers with a polymer material, ABS plastics, PLA, glass filled polyamides, stereolithography materials (epoxy resins), silver, titanium, steel, wax, photopolymers and polycarbonate. The custom sole structure may also be formed from a single material or a combination of different materials. For example, one side of custom sole structure 500 may be formed from a polymer whereas the opposing side may be formed from a foam. In addition, specific regions may be formed from different materials depending upon the anticipated forces experienced by each region.

In some embodiments, custom sole structure 500 as shown in FIG. 5 may be made from three-dimensional printer 502. The phrase "three-dimensional printer" as used throughout this detailed description and in the claims refers to a printing apparatus capable of printing or disposing a print substance that forms a three-dimensional object. Printable material could be associated with any color such as red, blue, green, yellow, white, black, or a combination thereof. Printable material could also be made of toner material made from acrylic, plastic, ink, or any other polymeric material known in the art for printing a three-dimensional object from three-dimensional printer 502.

FIG. 5 illustrates three-dimensional printer 502. Three-dimensional printer 502 could be, for example, a MakerBot® Repliactor™ 2. Three-dimensional printer 502 is connected to a power source (not shown) in order to supply a current to three-dimensional printer 502. Three-dimensional printer 502 further includes a print head 508 capable of moving in three dimensions and disposing a print substance forming a three-dimensional object, including a sole structure or other portions of an article of footwear. In the embodiment shown in FIG. 5, print head 508 is capable of delivering a printable material 504 onto a surface 510 of three-dimensional printer 502 in order to form portions of an article. In different embodiments, three-dimensional printer 502 is capable of printing multiple printable materials of varying densities and bond strengths. For example, first printable material 504 could have a first density and first bond strength, and a second printable material (not shown) could have a second density and second bond strength that differs from first printable material 504. It should be understood a more dense printable material or a printable material having a higher bond strength may create a more rigid structure made to withstand additional tearing, breaking, bending, and/or deforming.

FIG. 5 shows a portion of custom sole structure 500 being printed in three-dimensional printer 502. Three-dimensional printer 502 uses printable material 504 to print custom sole structure 500. Still, in other embodiments, custom sole structure 500 could be made from a combination of first printable material 504 and other printable materials.

The embodiments described above generally incorporate a three-dimensional printer in order to print custom sole structures. However, in other embodiments, these structures could be manufactured by means other than a three-dimensional printer. For example, other embodiments could use injection molding. Further, attachment of various portions of custom sole structure could include ultrasonic welding or radio frequency welding in order to create an upper having attached portions and fastener receiving portions.

In different embodiments, custom sole structure 500 may be configured with one or more structures or designs in order to achieve, for example, a certain look or function. In the embodiment shown in FIG. 6, a first custom sole structure 600 includes a first lattice structure 602. It should be noted that while these variations, features, and structures are described initially in relation to first custom sole structure 600, they may be applicable to any other custom sole structures described in this detailed description.

Figure 6:
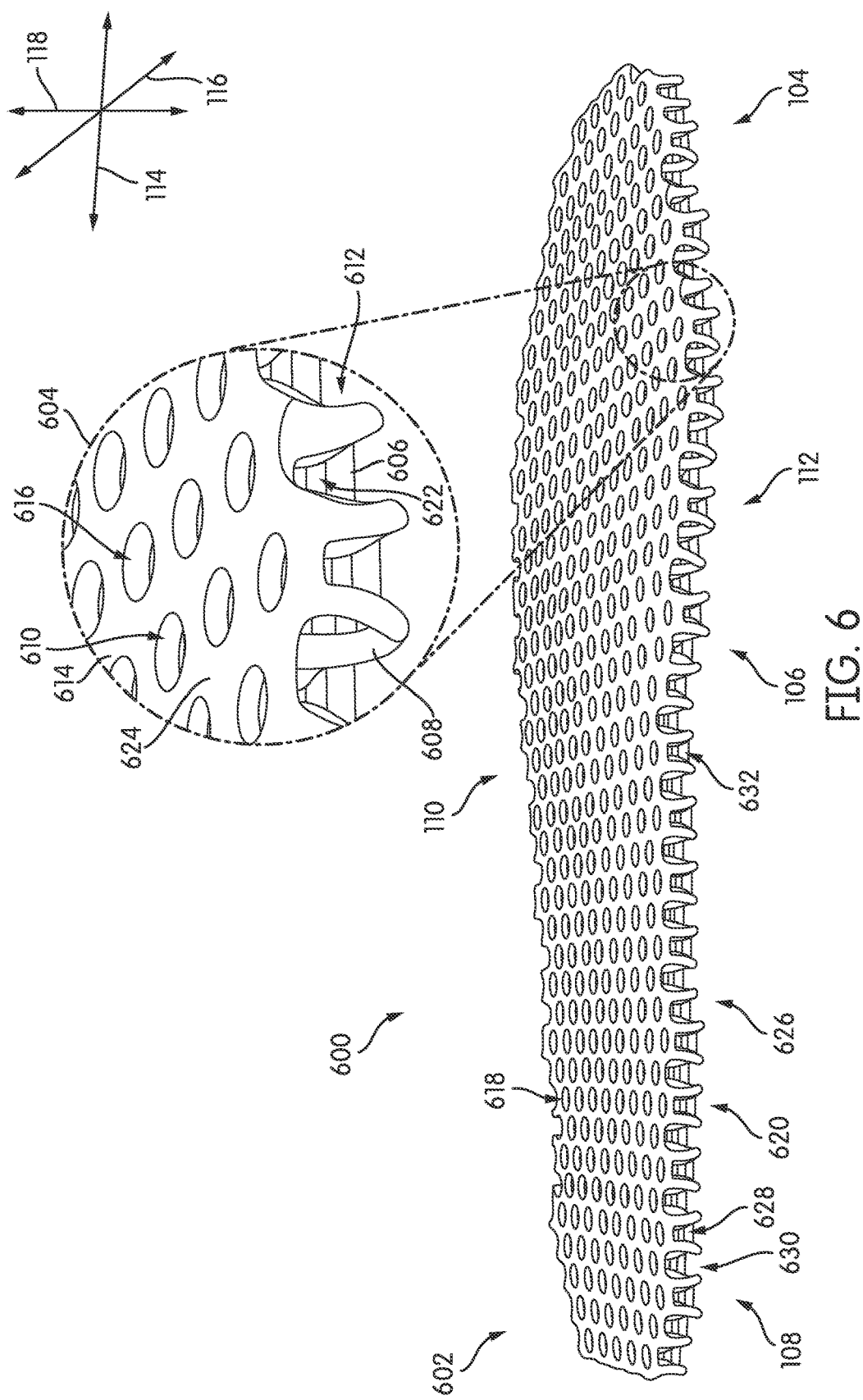
FIG. 6 is an isometric side view of an embodiment of a sole structure.

In FIG. 6, a first surface 624 is provided on an upper side 618 of first lattice structure 602, and a second surface 626 is provided on a bottom side 620 first lattice structure 602. Together, first surface 624 and second surface 626 comprise an exterior surface 614 of first lattice structure 602. Disposed along first surface 624 is a plurality of lattice apertures 610. In some embodiments, lattice apertures 610 may be disposed on both sides of first lattice structure 602, so that a plurality of lattice apertures 610 is also disposed along second surface 626. In other embodiments, lattice apertures 610 may be disposed on only one side of first lattice structure 602.

As illustrated in the figures, lattice apertures 610 are disposed over substantially the entire length and width of first lattice structure 602. In some embodiments, multiple rows of lattice apertures 610 may be disposed along first lattice structure 602. In the embodiment of FIG. 6, approximately forty-one rows of lattice apertures 610 are depicted. However, in other embodiments, there may be a fewer or greater number of rows of lattice apertures 610. The number of rows may be greater for sole structures designed for larger footwear sizes, and less for sole structures designed for smaller footwear sizes. In other embodiments, lattice apertures 610 may be disposed on only some portions of first lattice structure 602. Lattice apertures 610 may be arranged to correspond to and/or support the contours of plantar surface 102 of foot 100 as described above with reference to FIGS. 1-4.

In some embodiments, lattice apertures 610 may be in a staggered arrangement, as seen in FIG. 6. Thus, along a generally horizontal plane, exterior surface 614 may include repeated openings associated with lattice apertures 610. In some embodiments, lattice apertures 610 may be arranged in rows and columns along exterior surface 614 of upper side 618 and/or bottom side 620, where rows extend laterally across first custom sole structure 600, and columns extend longitudinally across first custom sole structure 600. A plurality of lattice apertures 610 may have a configuration of an array, having a number of rows N and a number of columns M, implying positions for a number of lattice apertures N×M. In some embodiments, there may be between four and thirteen columns, and between thirty and fifty rows. In one embodiment, there may be between 120 and 650 lattice apertures 610 disposed along one side of exterior surface 614. Other configurations of arrays of lattice apertures 610 may imply positions for more lattice apertures 610 or for fewer lattice apertures 610 than in the initial configuration.

A magnified area 604 of first custom sole structure 600 shows first lattice structure 602 with lattice apertures 610. In first custom sole structure 600, lattice apertures 610 have a rounded shape. In other embodiments, as discussed further below, lattice apertures 610 may include a wide variety of other geometries. Lattice apertures 610 may also have a cross-sectional shape that is round, square, or triangular, for example. In some embodiments, lattice apertures 610 may have a variety of geometric shapes that may be chosen to impart specific aesthetic or functional properties to first custom sole structure 600.

First custom sole structure 600 also includes an interior area 612 that lies between bottom side 620 and upper side 618 and is bounded by a peripheral side 632. In some embodiments, lattice apertures 610 extend from interior area 612 of first custom sole structure 600 to an exterior surface 614. In other configurations, two or more of lattice apertures 610 may be interconnected with each other.

In some embodiments, interior area 612 may be substantially hollow. In other embodiments, as in FIG. 6, there may be a plurality of vertical portions 608 disposed within interior area 612, forming hollow areas or interstices 622 within interior area 612. Interstices 622 may be chambers or compartments that are formed within first custom sole structure 600. In some embodiments, vertical portions 608 may extend downward in a generally vertical direction 118 from upper side 618 of first custom sole structure 600 toward bottom side 620. In one embodiment, vertical portions 608 may be curved as they extend downward. In another embodiment, one or more vertical portions 608 may be curved to form a generally semi-circular piece or half-circular piece. In some embodiments, two or more vertical portions 608 adjacent to one another may be disposed so that they help form interstices 622. In other embodiments, two or more adjacent vertical portions 608 may be disposed so that they curve away from one another. In some embodiments, when multiple vertical portions 608 are connected to and/or joined to exterior surface 614, as depicted in FIG. 6, three-dimensional, interconnected first lattice structure 602 is formed.

Along the edges of first custom sole structure 600, peripheral side 632 is shown. Peripheral side 632 may be smooth, rough, jagged, or may be otherwise irregular in different embodiments. Peripheral side 632 may correspond to the surface surrounding the outer boundary or perimeter of first custom sole structure 600, and be similar to a vertical wall or frame that is disposed between upper side 618 and bottom side 620 along its perimeter. In FIG. 6, peripheral side 632 is defined in part by repeating vertical portions 608. In different embodiments, peripheral side 632 may include a variety of shapes and structural features. In FIG. 6, peripheral side 632 includes a series of partially bounded areas, including a first bounded area 628 and an adjacent second bounded area 630. First bounded area 628 is bounded on three sides to form a curved shape, and has a concave opening along bottom side 620. Second bounded area 630 is also bounded on three sides to form a relatively more defined U-shape that has a convex opening along bottom side 620. In other embodiments, first bounded area 628 and second bounded area 630 may differ from one another or may be substantially similar, and may have different geometries.

In different embodiments, first lattice structure 602 may be straight or curved along its length. Portions of first lattice structure 602 may also be altered geometrically to have a round, oval, cubic, or pyramidal contour, for example. In some embodiments, first lattice structure 602 of first custom sole structure 600 is integrally constructed as a single piece during the manufacture process. In other embodiments, first custom sole structure 600 may be manufactured in various pieces and assembled and/or joined together.

It should be noted that in different embodiments, the design of the lattice structure may provide various structural features to the custom sole structure. In some embodiments, a few of which are described below, the lattice structure may include a wide variety of geometries, including a repeated arrangement of hollow cubes, spheres, and other regular or irregular shapes within the lattice structure. In some embodiments, the shapes may be open along their sides, and exposed along the exterior surface through lattice apertures 610. The geometry may be consistent across the custom sole structure, or it may include multiple geometries disposed in various portions of the custom sole structure. The included shapes may also be similar in size within the custom sole structure, or they may vary in size, so that one portion of the custom sole structure includes larger apertures and other portions include relatively smaller apertures.

In different embodiments, first lattice structure 602 and other lattice structures described herein may include structural features that allow first lattice structure 602 to support the weight of the wearer, as well as provide space for insertion or inclusion of further sole components, such as microbladders, cushioning elements, and other materials.

Various lattice structures as described here can provide a custom sole structure with specialized responses to ground reaction forces. In one embodiment, the lattice structure may attenuate and distributes ground reaction forces. For example, when a portion of the custom sole structure contacts the ground, the lattice structure can attenuate the ground reaction forces. The lattice structure may have the capacity to distribute the ground reaction forces throughout a substantial portion of the custom sole structure. The attenuating property of this type of structure can reduce the degree of the effect that ground reaction forces have on the foot, and the distributive property distributes the ground reaction forces to various portions of foot 100. In some embodiments, such features may reduce the peak ground reaction force experienced by foot 100.

In other embodiments, the lattice structure designs disclosed in this description may also include provisions to achieve a non-uniform ground reaction force distribution. For example, the ground reaction force distribution of a custom sole structure could provide a wearer with a response similar to that of barefoot running, but with attenuated ground reaction forces. That is, the custom sole structure could be designed to impart the feeling of barefoot running, but with a reduced level of ground reaction forces. Additionally, the ground reaction forces could be more concentrated in medial side 112 of foot 100 than along lateral side 110 of foot 100, thereby reducing the probability that the foot will over-pronate or imparting greater resistance to eversion and inversion of the foot.

Furthermore, there may be vibrational properties of the custom sole structure that enhance the user experience. When article 100 impacts the ground, the lattice structure can compress and vibrate. The vibrational frequency of the lattice structure may be dependent upon the configuration of the lattice structure (e.g., the manner in which the vertical portions and the horizontal portions are arranged to form geometrical patterns or hollow areas). Thus, the lattice structure may also be customized to have vibrational properties that are specific to the needs of the individual wearer or the activity for which the footwear is intended to be used.

Figure 7:
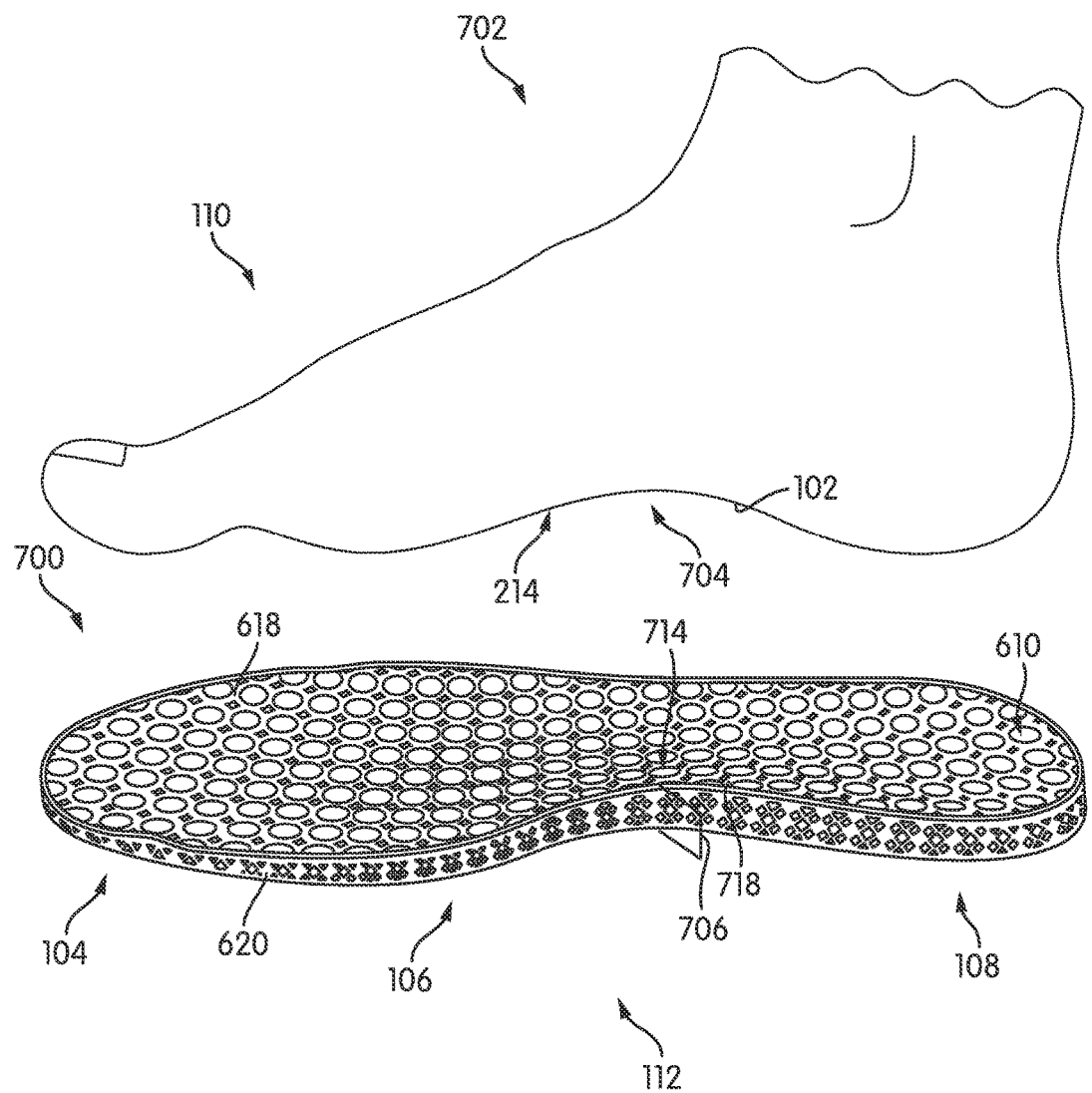
FIG. 7 is an isometric side view of an embodiment of a sole structure.
Figure 8:
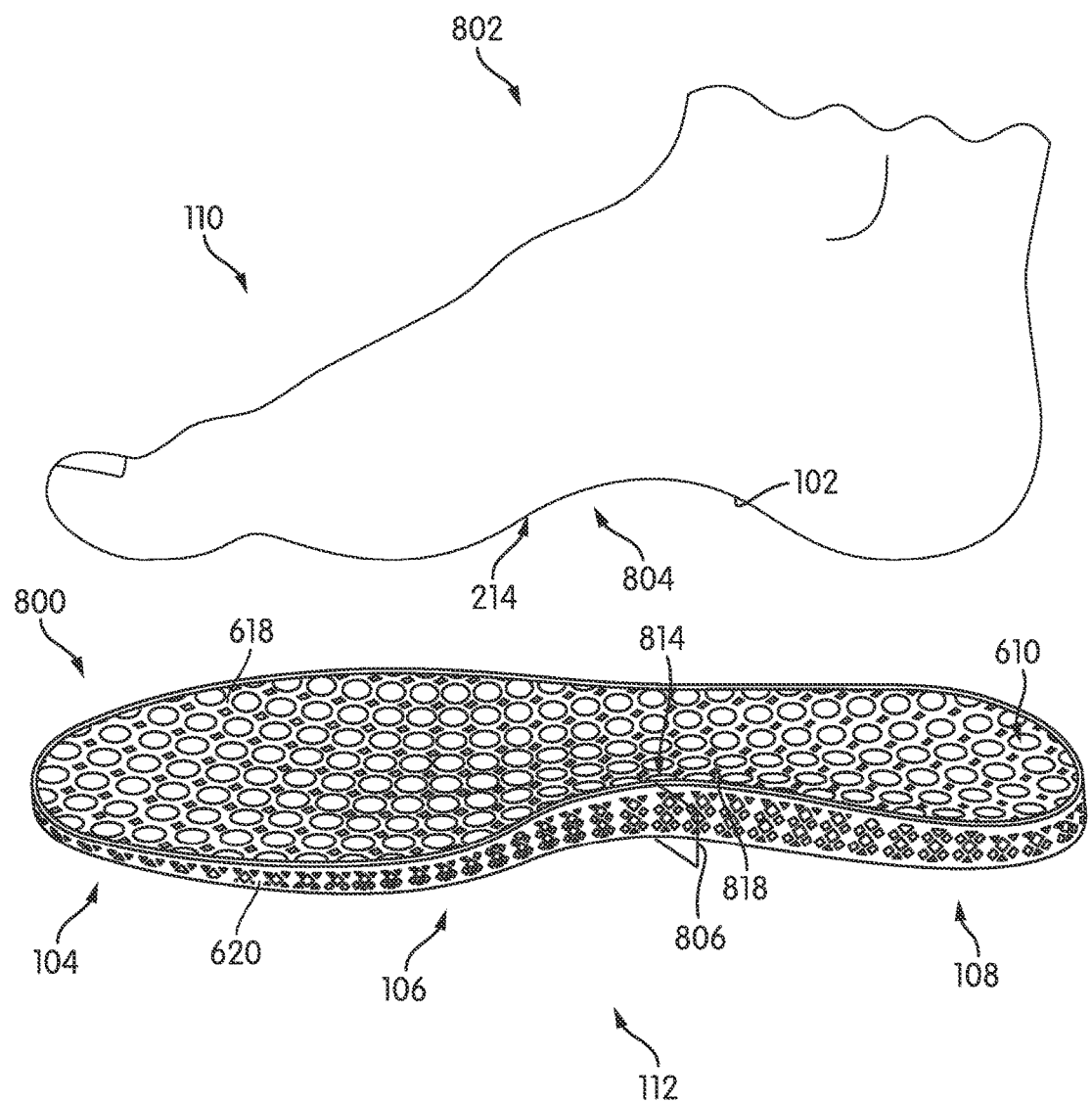
FIG. 8 is an isometric side view of an embodiment of a sole structure.
Figure 9:
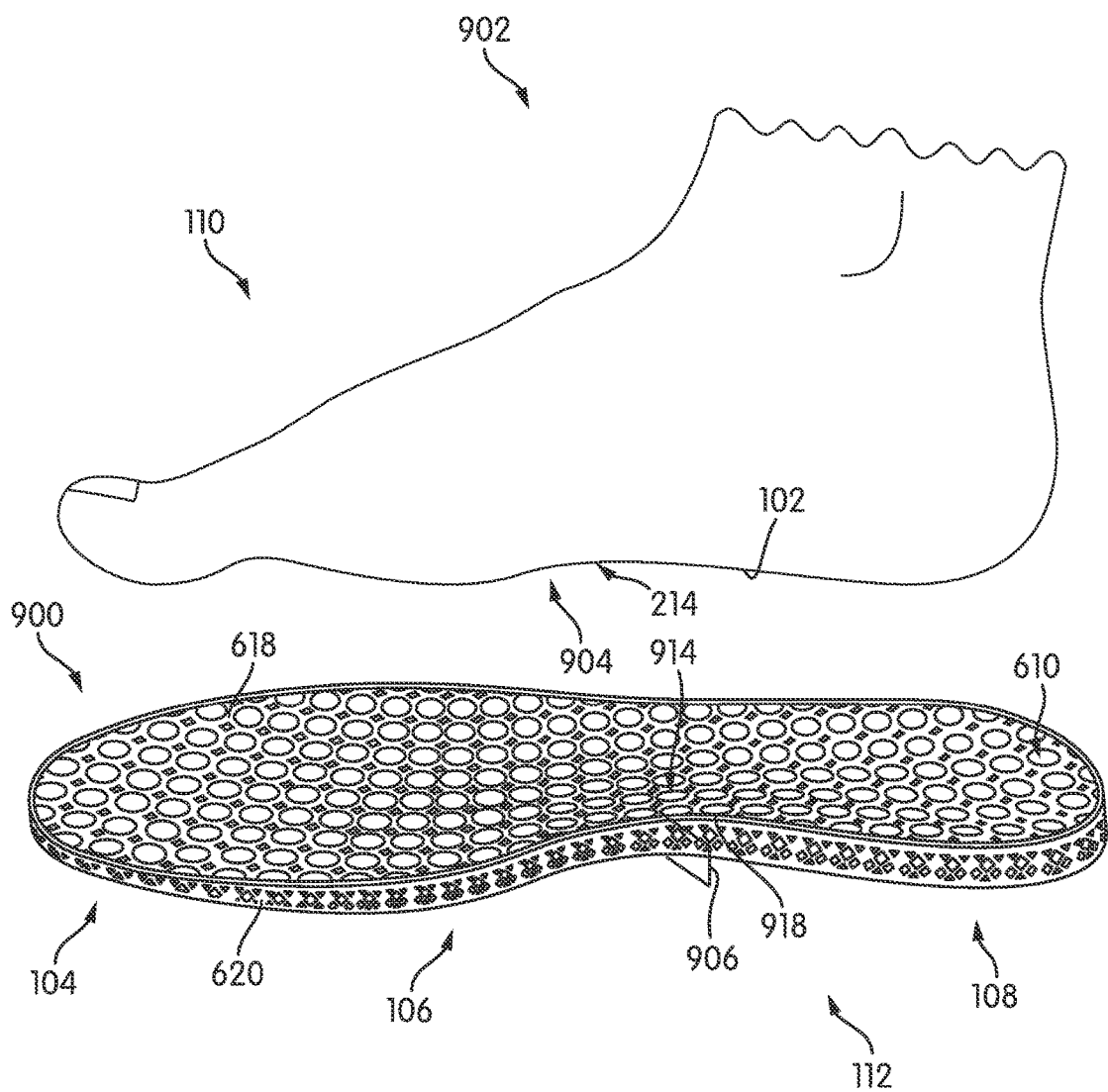
FIG. 9 is an isometric side view of an embodiment of a sole structure.

There are many possible variations in design that may be included in the custom sole structure. An alternative embodiment of the custom sole structure is illustrated in FIGS. 7-13, and will be discussed in further detail below. FIGS. 7-9 provide three depictions of a custom sole structure as they may be designed to support three different foot types. In FIG. 7, a first foot 702 with a relatively "normal arch" is shown. The arch area described here is typically associated with the area corresponding with sixth plantar pressure area 214 (see FIG. 2). A normal arch generally has a noticeable curve 704 inward, but not by more than ¾ of an inch. A normal arch is the most common type of foot arch, and is also the least susceptible to injury if provided with proper footwear. A second custom sole structure 700 that has been custom manufactured for first foot 702 is shown beneath first foot 702. In particular, upper side 618 of second custom sole structure 700 is contoured to match inward curve 704. A customized sixth plantar pressure area 714 has an area of maximum elevation 718 associated with a first height 706.

FIGS. 8 and 9 illustrate two other foot types. In FIG. 8, a "high arch" is illustrated in a second foot 802. A high arch can be associated with a higher inward curve 804 than that of a normal arch curve 704 as shown in FIG. 7. Plantar surface 102 of second foot 802 curves upward to a greater degree than plantar surface 102 of first foot 702. Individuals with high arches tend to supinate or underpronate, so that second foot 802 typically rolls outwards during running. High arched feet generally require running shoes with a higher support and a softer and/or flexible sole that absorbs shock. A corresponding third custom sole structure 800 is shown below second foot 802 that includes an upper side 618 shaped to support the high arch of second foot 802. A customized sixth plantar pressure area 814 has an area with a maximum elevation 818 associated with a second height 806 that is greater than first height 706.

In FIG. 9, a low or "flat arch" is depicted in third foot 902. Generally, flat feet have an arch curve 904 that is substantially flatter relative to a high arch or a normal arch. Thus, much of the bottom of third foot 902 can be flat. Beneath third foot 902 is a fourth custom sole structure 900. Individuals who are flat-footed generally overpronate, so that the feet typically roll inward during running. Individuals with flat feet often need shoes that assists in maintaining stability and motion control and provides additional support to midfoot region 106. A corresponding fourth custom sole structure 900 is shown below third foot 902 that includes an upper side 618 shaped to provide adequate support for the flattened arch of third foot 902. A customized sixth plantar pressure area 914 has an area with a maximum elevation 918 associated with a third height 906 that is less than first height 706. In different embodiments, each customized sole structure may include further variations not depicted in the figures. Some variations may include differences in shape, size, contour, elevations, depressions, curvatures, and other variations.

Figure 10:
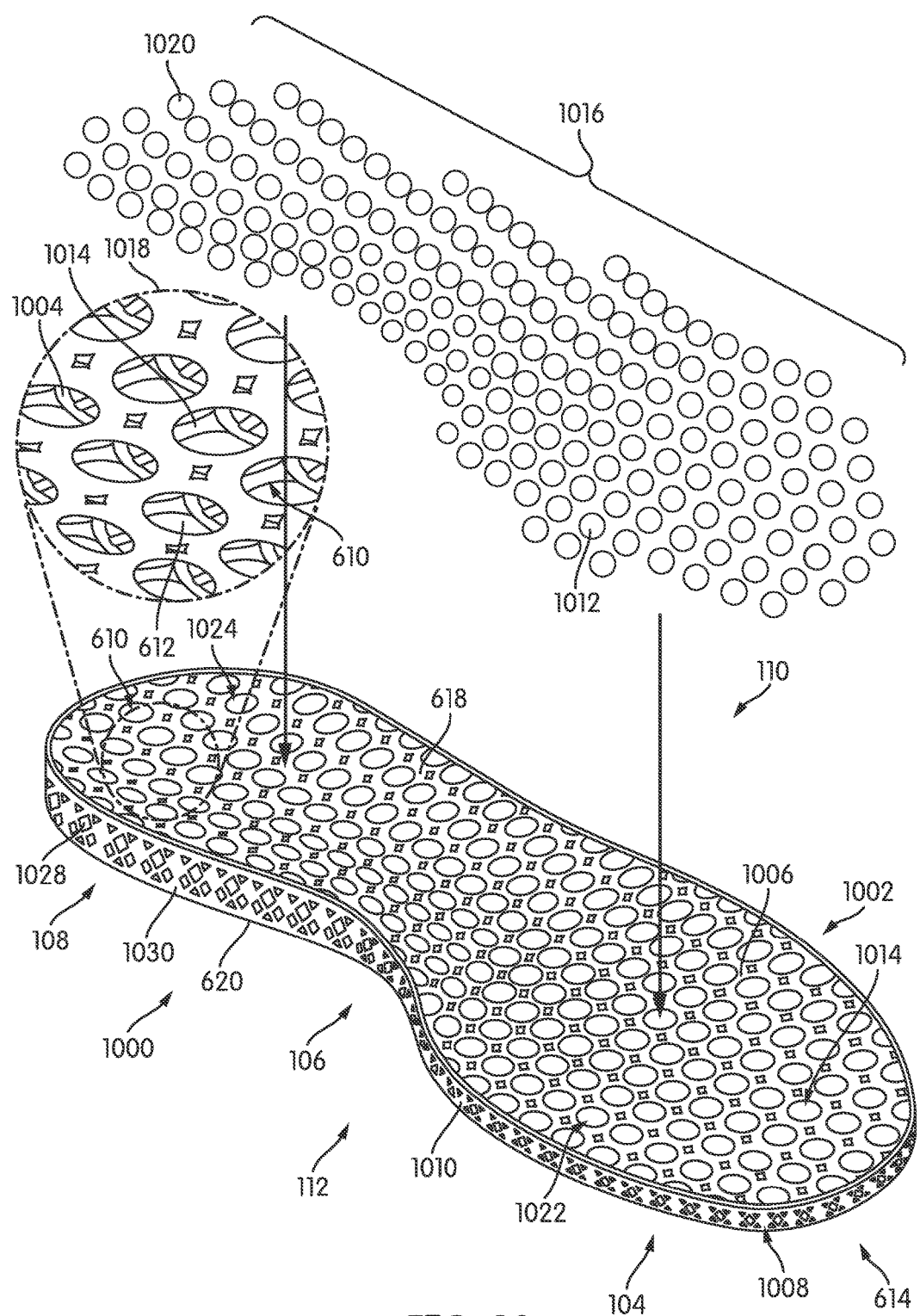
FIG. 10 is an isometric side view of an embodiment of a sole structure and components.
Figure 11:
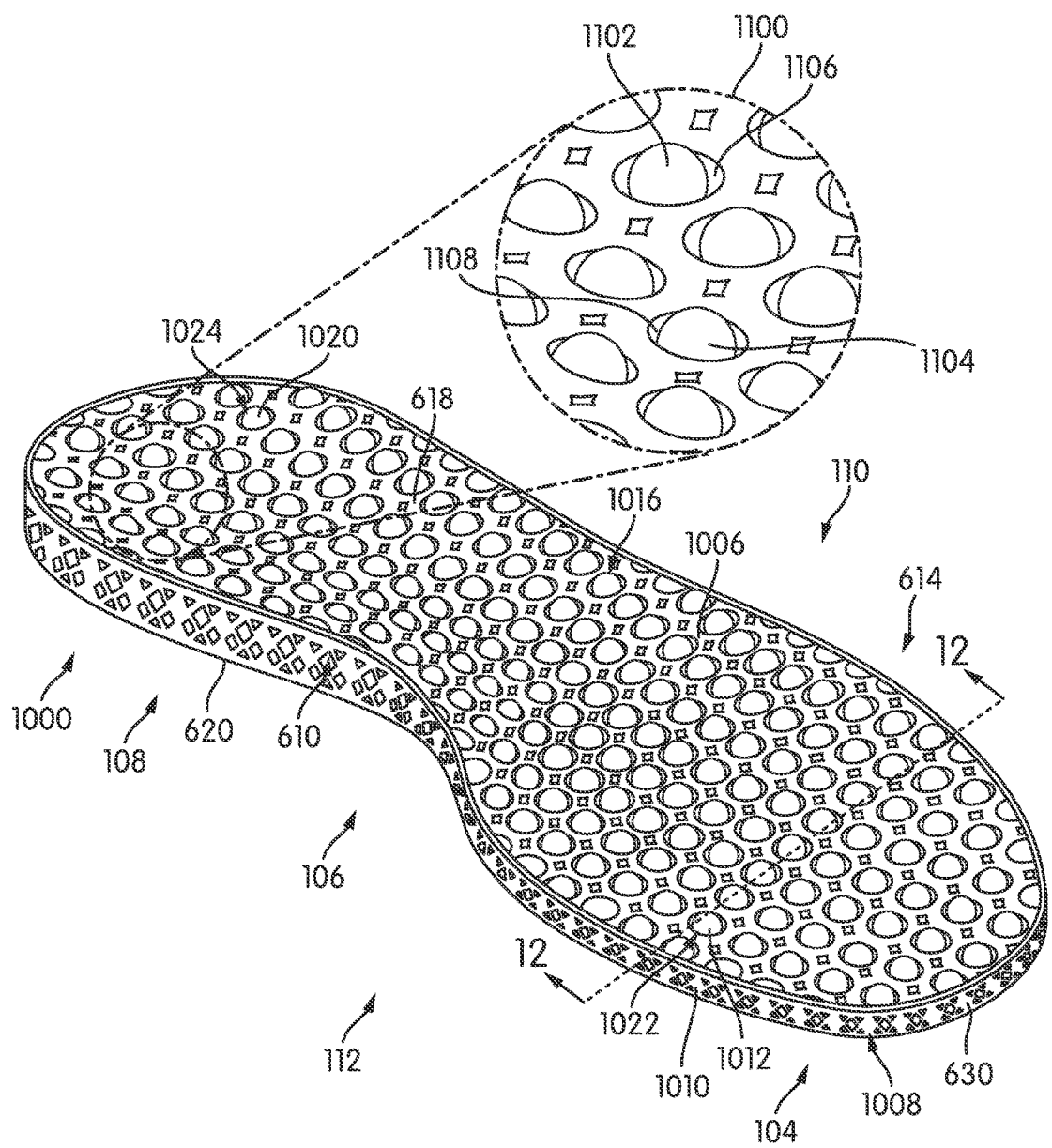
FIG. 11 is an isometric side view of an embodiment of a sole structure with components.
Figure 12:
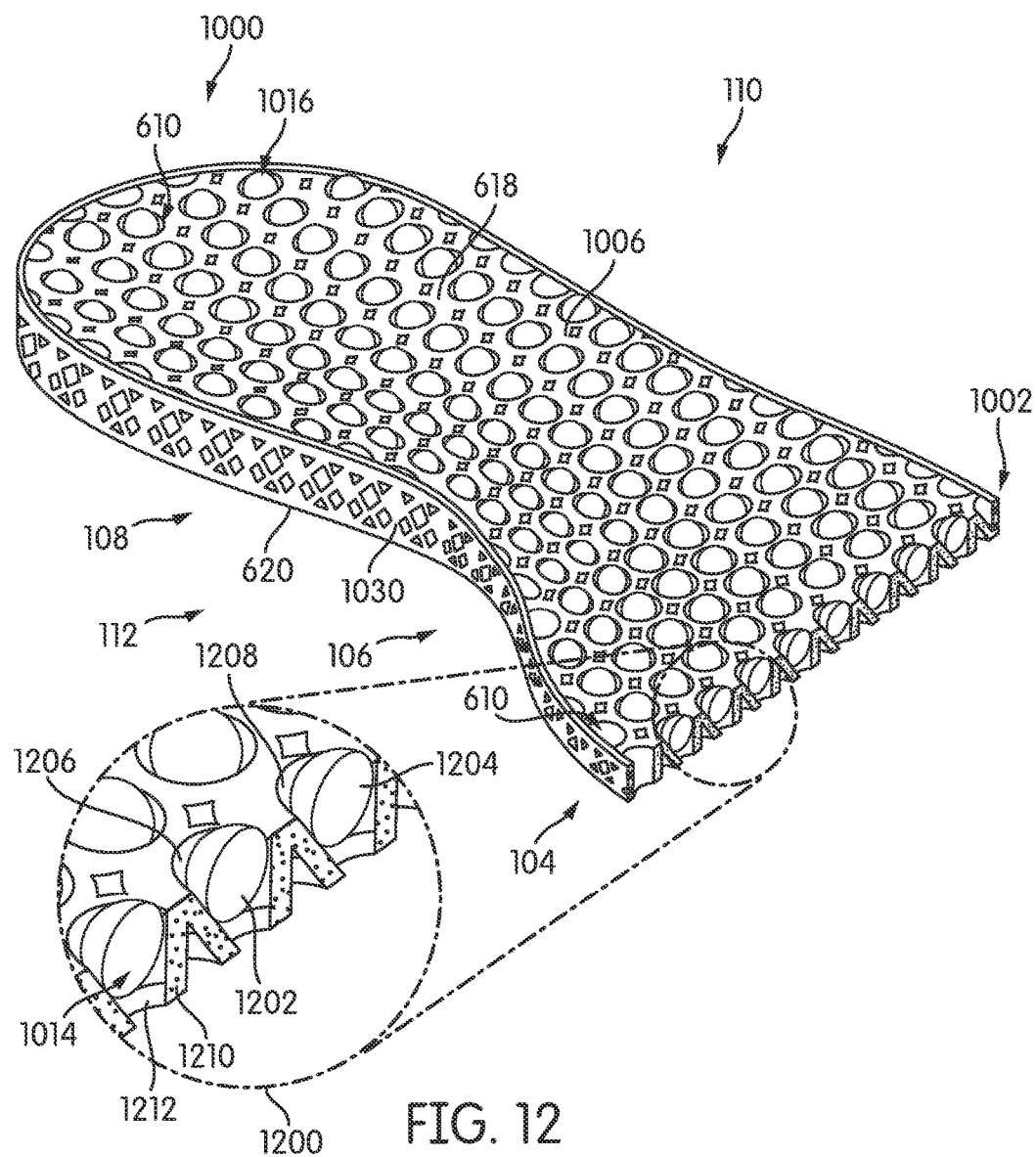
FIG. 12 is a cut-away view of the sole structure shown in FIG. 11.

In FIG. 10, another embodiment is depicted in a fifth custom sole structure 1000. Fifth custom sole structure 1000 includes a second lattice structure 1002. As seen in FIGS. 10-12, in some embodiments, along a generally horizontal plane, exterior surface 614 of fifth custom sole structure 1000 may include lattice apertures 610. In fifth custom sole structure 1000, lattice apertures 610 have a rounded shape. In other embodiments, lattice apertures 610 may include other shapes, as described with reference to FIG. 6.

As discussed with reference to FIG. 6, fifth custom sole structure 1000 in FIG. 10 includes interior area 612 that extends between bottom side 620 and upper side 618 and is bounded by a peripheral side 1030. A magnified area 1018 of fifth custom sole structure 1000 shows second lattice structure 1002 with lattice apertures 610. Second lattice structure 1002 is comprised of a series of repeating curved portions 1004 (similar to vertical portions 608 described above) disposed between upper side 618 and bottom side 620 and peripheral side 1030.

In one embodiment, peripheral side 1030 of fifth custom sole structure 1000 can include a plurality of perforations 1028. Perforations 1028 are openings that extend from exterior surface 614 of peripheral side 1030 to the interior surface of peripheral side 1030 (i.e., forming a kind of tessellated framework along the interior portion of peripheral side 1030). The plurality of perforations 1028 may be of different shapes or different sizes, or substantially uniform or any combination thereof. In one embodiment, perforations 1028 may include sharper edges relative to the openings associated with lattice apertures 610, including square and triangular shapes. In some areas of peripheral side 1030 there may be more perforations 1028 relative to other areas of peripheral side 1030.

In some embodiments, interior area 612 may be substantially hollow. In other embodiments, there may be a plurality of curved portions 1004 disposed within interior area 612, adjacent to interstices 1014. Interstices 1014 may be similar to chambers or compartments within fifth custom sole structure 1000. In some embodiments, curved portions 1004 may extend downward in a generally vertical direction 118 from upper side 618 of fifth custom sole structure 1000 toward bottom side 620. In one embodiment, curved portions 1004 may include edges or change orientation as they extend downward. In another embodiment, one or more curved portions 1004 may form a generally semi-circular piece or half-circular piece. In some embodiments, two or more curved portions 1004 adjacent to one another may be disposed so that they help form interstices 1014 within interior area 612 by curving toward one another. In other embodiments, two or more adjacent curved portions 1004 may be disposed so that they curve away from one another.

In the embodiment of FIG. 10, exterior surface 614 is comprised of a first surface 1006 on upper side 618, a second surface 1008 on bottom side 620, and a third surface 1010 along the outer perimeter of fifth custom sole structure 1000, associated with peripheral side 1030. Second surface 1008 may be more visible in FIG. 13. Disposed along first surface 1006 are one or more lattice apertures 610. In some embodiments, lattice apertures 610 may be disposed on both sides of second lattice structure 1002, so that lattice apertures 610 are also disposed along second surface 1008. In other embodiments, lattice apertures 610 may be disposed on only one side of second lattice structure 1002. In one embodiment, lattice apertures 610 may be disposed only along first surface 1006 or second surface 1008. In another embodiment, lattice apertures 610 may also be disposed along third surface 1010.

In different embodiments, lattice apertures 610 may be disposed in various arrangements along exterior surface 614, as discussed previously with reference to FIG. 6. For example, in one embodiment, lattice apertures 610 may be disposed in a relatively random configuration. In other embodiments, lattice apertures 610 apertures may be linearly arranged in rows and columns along exterior surface 614. In some embodiments, lattice apertures 610 may be in a staggered arrangement, as seen in FIG. 10.

In some embodiments where lattice apertures 610 are disposed along multiple surfaces, lattice apertures 610 may have varying sizes with respect to one another, or they may have the same size. For example, lattice apertures 610 disposed on first surface 1006 may be larger than lattice apertures 610 disposed on second surface 1008. Furthermore, lattice apertures 610 may vary with respect to one another in shape along each surface, or the shapes may each be the same. For example, in FIG. 10, first surface 1006 and second surface 1008 include lattice apertures 610 that are generally rounded or circular. In other embodiments, lattice apertures 610 may differ from one another in both size and shape along the same surface.

In some embodiments, second lattice structure 1002 may also be altered or designed to have a round, oval, cubic, or pyramidal contours, for example, or include other regular or irregular geometry.

As described earlier, in some embodiments, fifth custom sole structure 1000 may include one or more interstices 1014 within second lattice structure 1002. Interstices 1014 may remain substantially hollow or, during or after manufacture, interstices 1014 may be partially or substantially filled with one or more materials, substances, and/or support components. In some embodiments, support components 1016 may comprise an air bladder. In other embodiments, support components 1016 may comprise an air cushioning element. It should be noted that support components 1016 may also be referred to as air bladder components for purposes of this description. In different embodiments, the material that can fill or be included within interstices 1014 can vary widely. In one embodiment, the material may include one or more support components 1016. In the embodiment of FIGS. 10 and 11, support components 1016 include a first support component 1012 and a second support component 1020.

In different embodiments, support components 1016 may be incorporated into a lattice structure in various ways. In some embodiments, support components 1016 may be inserted or compressed through lattice apertures 610 after a lattice structure has been formed. In some embodiments, there may be temporary deformation of support components 1016 before or during insertion into interstices 1014. In other embodiments, support components 1016 can be included in the lattice structure during manufacture or printing of lattice structure. For example, support components 1016 may be disposed in partially formed interstices 1014 of second lattice structure 1002 as it is manufactured, and once interstices 1014 have been filled, the manufacture of second lattice structure 1002 may be completed. In another embodiment, one side or portion of third surface 1010 may be left open for insertion of support components 1016. In other embodiments, an opening may be provided along first surface 1006 or second surface 1008 for insertion of support components 1016. Upon formation of substantially the entire second lattice structure 1002, support components 1016 may be inserted or placed within interior area 612 of second lattice structure 1002 through the provided opening. In some embodiments, the opening may be at least partially filled, sealed, or otherwise closed following the insertion of support components 1016. In other embodiments, support components 1016 may be maintained in an environment with greater atmospheric pressure than standard, normal or ambient atmospheric pressure. After the manufacture of second lattice structure 1002, support components 1016 may be inserted into second lattice structure 1002. Once inserted, support components 1016 may be exposed to standard atmospheric pressure, which will allow support components 1016 to expand to the appropriate size within second lattice structure 1002. Similarly, in another embodiment, support components 1016 may be stored at low temperatures relative to normal or room temperature, and upon insertion into second lattice structure 1002, the increase in temperature will permit support components 1016 to expand to a size that allows support components 1016 to fit snugly and securely within interstices 1014.

Support components 1016 may vary in structural design. In different embodiments, the shape and sizes of support components 1016 may differ, as will also be discussed further below with reference to FIGS. 14 and 15. In FIGS. 10 and 11, first support component 1012 and second support component 1020 include a generally spherical shape. In other embodiments, support components 1016 may include a prism, cube, pyramidal, cylindrical, cone or other shape. When incorporated into fifth custom sole structure 1000 as shown in FIG. 11, support components 1016 may have a shape and size that fits relatively securely and firmly within interstices 1014.

As shown in FIGS. 10-12, lattice apertures 610 along upper side 618 and/or bottom side 620 may include openings, recesses, or cavities for substantially conforming to regions associated with the top and/or bottom of support components 1016. In some embodiments, lattice apertures 610 are in fluid communication with interstices 1014. In one embodiment, first support component 1012 is disposed in a first aperture 1022 associated with an interstice, and second support component 1020 is disposed in a second aperture 1024 associated with an interstice. In other words, first aperture 1022 is in fluid communication with a corresponding interstice, and second aperture 1024 is also in fluid communication with an interstice. This can be seen in greater detail in a magnified area 1100 in FIG. 11. A third support component 1102 is disposed in an interstice of fifth custom sole structure 1000, the top surface of third support component 1102 is visible through a third aperture 1106. A fourth support component 1104 is similarly disposed in fifth custom sole structure 1000 where the top surface of fourth support component 1104 is visible through a fourth aperture 1108. Thus, in some embodiments, after a support component has been inserted or disposed within fifth custom sole structure 1000 where some portion of the support component may be seen protruding out of a corresponding aperture. In the case of first support component 1012, a relatively small portion of first support component 1012 is visible and exposed along exterior surface 614. The amount by which a portion of support components 1016 project up from lattice apertures 610 along upper side 618 may vary. The protruding portion of support components 1016 may project to varying heights above upper side 618, as long as the height does not interfere with the placement and/or relative comfort of the foot in the corresponding article of footwear. In other embodiments, support components 1016 may be completely enclosed within interior area 612 so that there is no region protruding above upper side 618.

In different embodiments, support components 1016 may be arranged within interstices 1014 so that a majority of interstices 1014 disposed within interior area 612 are provided with support components 1016. For instance, support components 1016 may provide approximately 60% or more of the volume of interior area 612. In another example, support components 1016 may provide approximately 70% or more of the volume of interior area 612. In one embodiment, support components 1016 may comprise over 80% of the volume of interior area 612. In another embodiment, support components 1016 may comprise at least 90% of the volume of interior area 612.

Upon inclusion of support components 1016 in fifth custom sole structure 1000, there may be a plurality of support components 1016 disposed within interstices 1014. In some embodiments, fifth custom sole structure 1000 may include between 100 and 250 support components 1016. In another embodiment, fifth custom sole structure 1000 may include between 150 and 200 support components 1016. In one embodiment, there may be at least one support component for each fully formed interstice 1014. For purposes of this disclosure, a fully formed interstice refers to an interstice 1014 that is not adjacent to peripheral side 1030, and is completely enclosed. Interstices 1014 disposed near peripheral side 1030 may be abbreviated or otherwise include an irregular or partially formed geometry and/or be associated with lattice apertures 610 that are partially formed. It should also be noted that in some embodiments, there may be more multiple support components 1016 disposed within the space (hollow area 1014) defined by a single lattice aperture 610.

In different embodiments, support components 1016 may include a fluid. In one embodiment, one or more support components 1016 may be sealed to contain a pressurized fluid. In some embodiments, the fluid may be air or a type of gas. For example, first support component 1012 and second support component 1020 can each enclose a fluid that can be at atmospheric pressure or that can be pressurized between zero and three-hundred-fifty kilopascals (i.e., approximately fifty-one pounds per square inch) or more, with a pressure of zero representing the ambient air pressure at sea level. In addition to air and nitrogen, the fluid contained by first support component 1012 and second support component 1020 can include octafluorapropane or be any of the gasses disclosed in U.S. Pat. No. 4,340,626 to Rudy, such as hexafluoroethane and sulfur hexafluoride, for example.

In some embodiments, one or more support components 1016 may include chambers or sealed spaces that enclose pressurized fluid, thereby providing cushioning and support to the foot. In some embodiments, the pressures of fluid within support components 1016 may be advantageously selected and varied to provide a desired amount of cushioning and support for different portions of a foot. For example, the pressurized fluid within support components 1016 in heel region 108 may be selected to be at a higher pressure than the pressurized fluid included within support components 1016 in forefoot region 104, in order to provide greater cushioning and support to a heel portion of a foot. In another configuration, the pressure of the pressurized fluid may vary from support component to support component. For example, the range of pressure in the plurality of support components 1016 disposed within fifth custom sole structure 1000 may gradually decrease from heel region 108 to forefoot region 104.

A wide range of polymer materials may be utilized for the support components 1016 discussed herein, including various polymers that can resiliently retain a fluid, such as air or another gas. In selecting materials for support components 1016, engineering properties of the material (e.g., tensile strength, stretch properties, fatigue characteristics, dynamic modulus, and loss tangent) as well as the ability of the material to prevent the diffusion of the fluid contained may be considered. In some embodiments, thermoplastic urethane, polyurethane, polyester, polyester polyurethane, and polyether polyurethane may be used to form support components 1016. Support components 1016 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein layers include ethylene-vinyl alcohol copolymer, thermoplastic polyurethane, and a regrind material of the ethylene-vinyl alcohol copolymer and thermoplastic polyurethane. Another suitable material for support components 1016 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material.

Support components 1016 can be included in interior area 612 of fifth custom sole structure 1000 so that they are disposed from forefoot region 104 to heel region 108 and also from lateral side 110 to medial side 112, thereby corresponding with a general outline of foot 100. When foot 100 is located within an article of footwear that includes fifth custom sole structure 1000, support components 1016 can extend under a majority of foot 100 or substantially all of foot 100. Support components 1016 may be arranged in a manner that helps attenuate ground reaction forces that are generated when fifth custom sole structure 1000 is compressed between foot 100 and the ground during various ambulatory activities, such as running and walking.

Such a configuration of custom sole structures can provide resilient support that provides many advantages. For example, the inclusion of support components 1016 within fifth custom sole structure 1000 where support components 1016 include an air bladder or are fluid-filled may provide benefits associated with a lighter article of footwear. In some embodiments, the use of support components 1016 in orthotics for an article of footwear can help support weakened areas of foot 100 and assist the user in each step. While a relatively rigid material, as included in fifth custom sole structure 1000, can provide functional support to the foot, softer or more flexible materials can absorb the loads put on the foot and provide protection. Such softer materials, such as support components 1016, can absorb the loads placed on foot 100, increase stabilization, and take pressure off uncomfortable or sore spots of the feet. In one embodiment, an orthotic can include a relatively soft interior material reinforced with a more rigid support such as that comprising second lattice structure 1002. This type of orthotic may offer both functional support and protection.

FIG. 12 provides a cut-away view of fifth custom sole structure 1000 along the axis labeled "12" in FIG. 11. In different embodiments, interstices 1014 bounded by the openings provided by lattice apertures 610 may have a cross-sectional shape that is partially round, cylindrical, square, or triangular, or another irregular shape, for example. In some embodiments, interstices 1014 may include a variety of geometrical shapes that may be chosen to impart specific aesthetic or functional properties to fifth custom sole structure 1000. As can be seen in a magnified area 1200, second lattice structure 1002 includes curved portions 1212 and diagonal portions 1210 that together form an internal structure that can contain, receive, or otherwise hold support components 1016.

Furthermore, as noted above, support components 1016 may have a uniform size or may vary in size. In one embodiment, support components 1016 may be generally spherical and similar in size. In FIG. 12, a fifth support component 1202 and a neighboring sixth support component 1204 are shown in cross-section in magnified area 1200. Fifth support component 1202 and sixth support component 1204 are each portions of a sphere. The interior space of fifth support component 1202 and sixth support component 1204 can be hollow or generally empty, or may contain a fluid or another relatively soft material. When filled with fluid such as air, fifth support component 1202 may provide a third interstice 1206 with the support of an air bladder, and sixth support component 1204 may provide a fourth interstice 1208 with the support of an air bladder. The air bladders can help absorb loads or other forces applied to fifth custom sole structure 1000.

In other embodiments, support components 1016 in midfoot region 106 and in heel region 108 may have a larger cross-sectional shape or a larger diameter than support components 1016 in forefoot region 104. In another example, support components 1016 in heel region 108 may have a larger cross-sectional shape or diameter than support components 1016 in midfoot region 106 and support components 1016 in forefoot region 104, and support components 1016 in forefoot region 104 may have a larger cross-sectional shape or diameter than support components 1016 in midfoot region 106. In another example, support components 1016 in midfoot region 106 may have a larger cross-sectional shape or diameter than support components 1016 in heel region 108 and support components 1016 in forefoot region 104.

Figure 13:
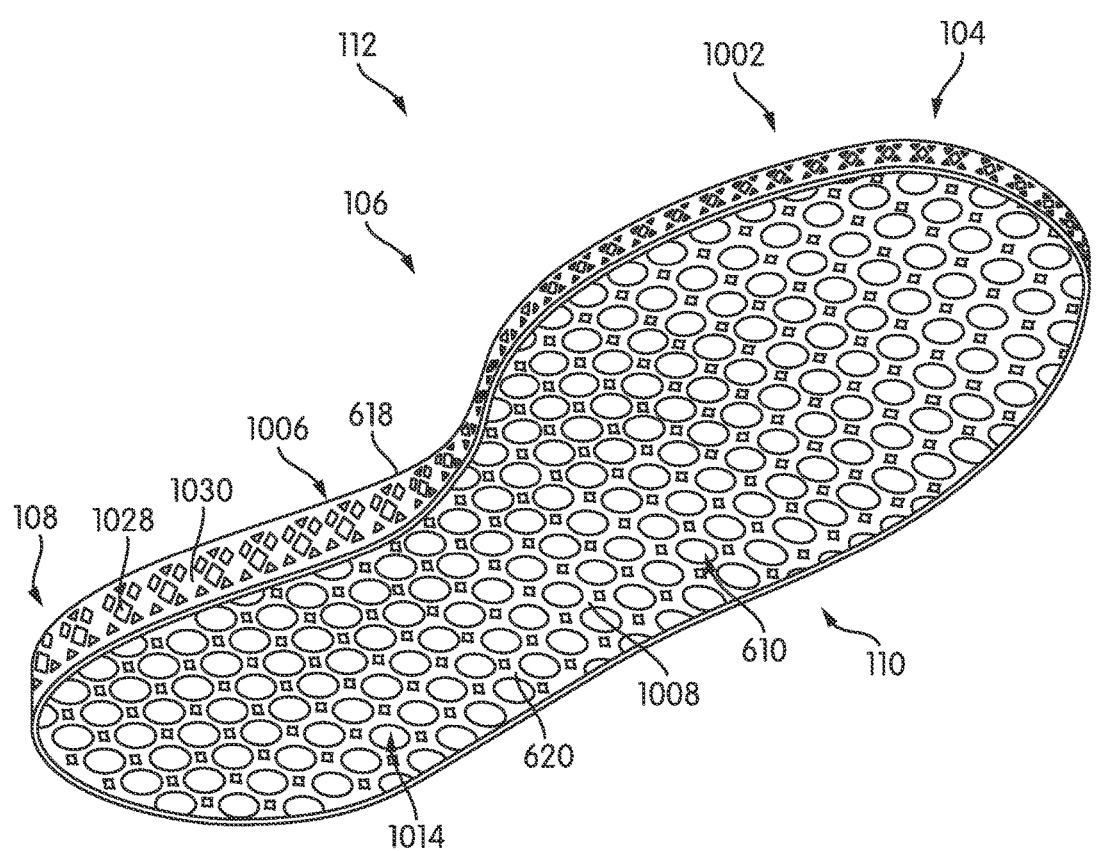
FIG. 13 is an isometric bottom view of an embodiment of a sole structure and components.

FIG. 13 is an isometric view of bottom side 620 of second lattice structure 1002. A first surface 1006 is provided on exterior surface 614 of upper side 618, and a second surface 1008 is provided on exterior surface 614 of bottom side 620. Disposed along second surface 1008 are one or more lattice apertures 610. As described with reference to FIG. 10, in some embodiments, lattice apertures 610 may be disposed on both sides of second lattice structure 1002, so that lattice apertures 610 are also disposed along first surface 1006 and second surface 1008. In some embodiments, the structure associated with bottom side 620 may be similar to the structure associated with upper side 618, as described above. In other embodiments, bottom side 620 may differ from upper side 618 in geometry, lattice aperture pattern, material, and other features. In the embodiment of FIG. 13, bottom side 620 is flat relative to the contours discussed in relation to upper side 618. In other embodiments, bottom side 620 may also include various customizable contours or configurations.

Figure 14:
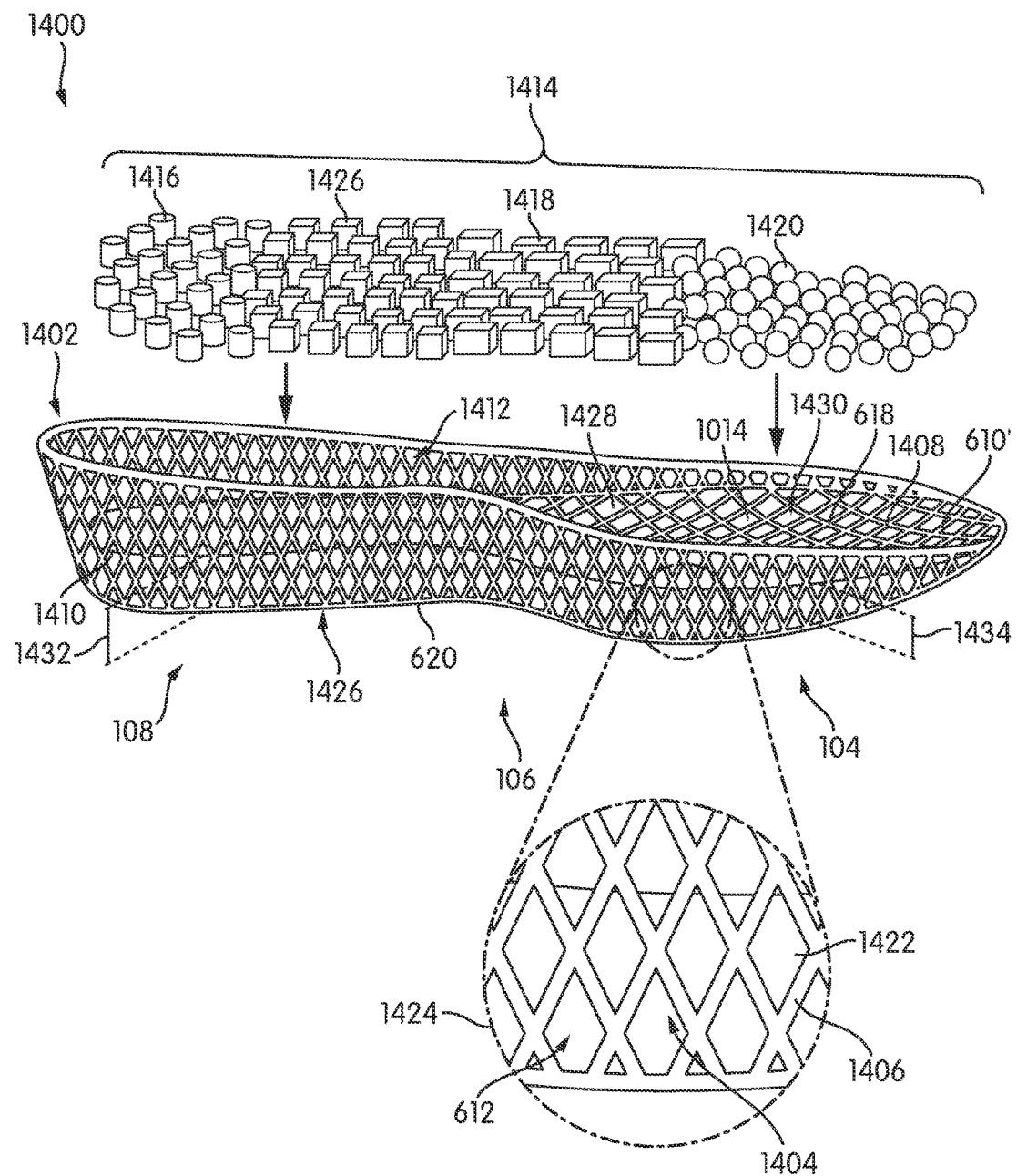
FIG. 14 is an isometric side view of an embodiment of a sole structure and components.
Figure 15:
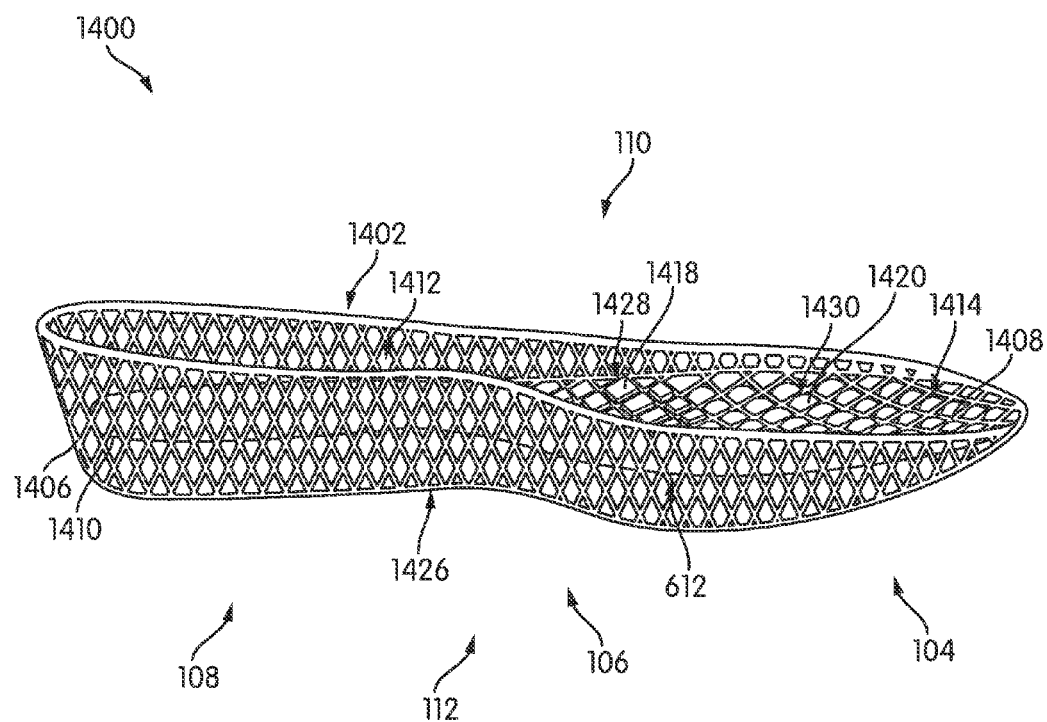
FIG. 15 is an isometric side view of an embodiment of a sole structure with components.

In a third example, an embodiment of a sixth custom sole structure 1400 is depicted in FIGS. 14 and 15. Sixth custom sole structure 1400 includes a third lattice structure 1402, including a first surface 1408, a second surface 1426 (represented by bottom side 620 of sole structure 1400), a third surface 1410, and a fourth surface 1412. First surface 1408 is associated with upper side 618 and second surface 1426 is associated with bottom side 620. Third surface 1410 and fourth surface 1412 are associated with generally opposite sides of peripheral side 1404, where third surface 1410 faces inward, and fourth surface 1412 faces outward. In sixth custom sole structure 1400, a series of repeated lath portions 1406 are joined to form third lattice structure 1402. Lath portions 1406 disposed along peripheral side 1404 can be seen to form perforations 1422 in a magnified area 1424. In some embodiments, perforations 1422 can be generally similar in shape and/or size to lattice apertures 610 disposed along first surface 1408 and second surface 1426. In other embodiments, perforations 1422 may differ in shape and/or size from lattice apertures 610. In the embodiment of FIG. 14, perforations 1422 may be more narrow and diamond-shaped than lattice apertures 610.

Depicted above sixth custom sole structure 1400 are a plurality of support components 1414. In FIGS. 14 and 15, support components 1414 include a first support component 1416, a second support component 1426, a third support component 1418, and a fourth support component 1420. As mentioned earlier, support components 1414 may include a variety of geometries and sizes. In some embodiments, first support component 1418, second support component 1426, third support component 1418, and fourth support component 1420 may each be a member of a set of similarly shaped components, or components with substantially similar geometry. For example, first support component 1416 includes a generally cylindrical shape, second support component 1426 includes a generally cuboid shape, third support component 1418 includes a generally rectangular prism shape, and fourth support component 1420 includes a generally spherical shape. In other embodiments, the included support components 1414 may differ from those depicted.

Variation of the shapes of support components 1414 may permit custom sole structures to be designed for different uses and capacities. In some embodiments, heel region 108 may include a thicker heel in order to raise the heel of the wearer's foot higher than the toes, as is common is some women's footwear. For example, sixth custom sole structure 1400 may be designed for inclusion in footwear such as a women's sandal. In such cases, the portion of interior area 612 associated with heel region 108 of sixth custom sole structure 1400 may be designed to include greater volume relative to the volume associated with interior area 612 of forefoot region 104. Furthermore, in FIG. 14, the distance between upper side 618 and bottom side 620 in heel region 108 is associated with a first height 1432, and the distance between upper side 618 and bottom side 620 in forefoot region 104 is associated with a second height 1434. In some embodiments, first height 1432 may differ from second height 1434. In the embodiment of FIGS. 14 and 15, first height 1432 is greater than second height 1434. In other embodiments, first height 1432 may be substantially similar to or less than second height 1434.

In one embodiment, variations in the heights or volume in different regions of sixth custom sole structure 1400 may provide interstices 1014 that are suited to the variations in the shapes and sizes of support components 1414. For example, the cylindrical shape of first support component 1416 may be better suited to interstices 1014 defined by first height 1432, while the generally spherical shape of fourth support component 1420 may be suited to interstices 1014 defined by second height 1434.

As shown in FIG. 15, support components 1414 may be incorporated into sixth custom sole structure 1400. Support components 1414 may have shapes and sizes that permits them to fit relatively snugly within interstices 1014 of interior area 612. In some embodiments, lattice apertures 610 along upper side 618 and/or bottom side 620 may include recesses or cavities for substantially conforming to top and/or bottom of the various size and/or shapes of support components 1414. In one embodiment, shown in FIG. 15, third support component 1418 is disposed in an interstice associated with a first aperture 1428, and fourth support component 1420 is disposed in an interstice associated with a second aperture 1430. First support component 1416 and second support component 1426 (not shown in FIG. 15) may also be incorporated into sixth custom sole structure 1400, near heel region 108 and/or midfoot region 106, for example. In some embodiments, after third support component 1418 has been included within sixth custom sole structure 1400, a region of third support component 1418 can protrude out of first aperture 1428 so that a relatively small portion of third support component 1418 is visible and exposed along exterior surface 614. Similarly, other support components 1414 may also protrude out of their corresponding lattice apertures 610. The amount by which the top surface of support components 1414 project up from lattice aperture 610 along upper side 618 may vary. The top surface of support components 1414 may project to varying heights above upper side 618, as long as the height does not interfere with the placement and/or relative comfort of the foot in the corresponding article of footwear. In other embodiments, support components 1414 may be completely enclosed within interior area 612.

Support components 1414 may be arranged within interstices 1014 so that a majority of interstices 1014 disposed within interior area 612 are provided with support components 1414. For instance, support components 1414 may provide approximately 70% or more of the volume of interior area 612. In another example, support components 1414 may provide approximately 80% or more of the volume of interior area 612.

Upon inclusion of support components 1414 in sixth custom sole structure 1400, there may be multiple support components 1414 disposed within interstices 1014. In some embodiments, sixth custom sole structure 1400 may include between 100 and 250 support components 1414. In another embodiment, sixth custom sole structure 1400 may include between 150 and 200 support components 1414. In one embodiment, there may be at least one support component 1414 for each fully formed lattice aperture 610. It should be noted that in some embodiments, there may be more than one support component 1414 disposed within the compartments of interstices 1014.

Figure 16:
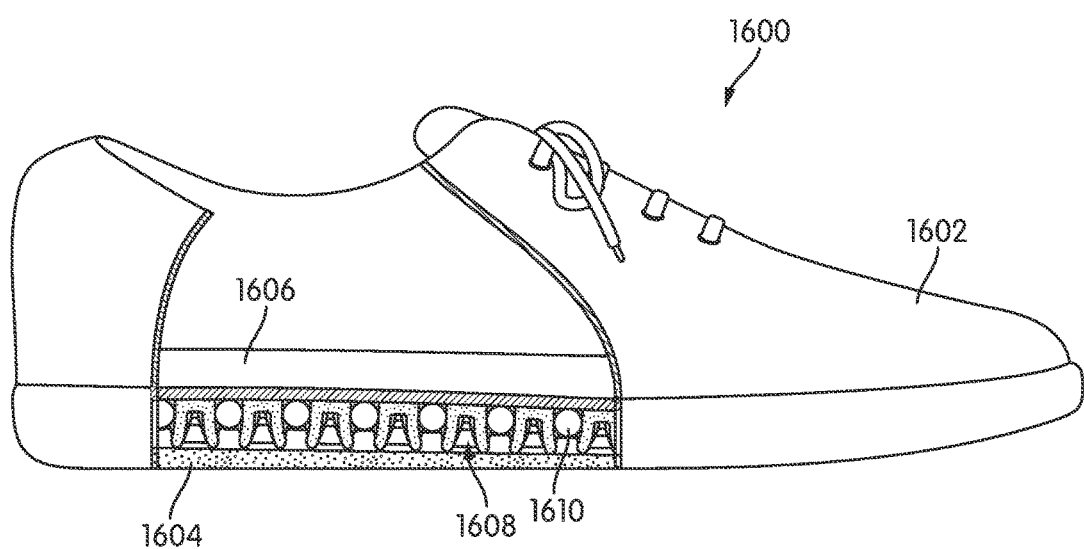
FIG. 16 is a cut-away view of an embodiment of an article of footwear including a sole structure.

In FIG. 16, an article of footwear 1600 that includes a seventh custom sole structure 1608 is depicted with a cut-away view. Seventh custom sole structure 1608 incorporates support components 1610. Article of footwear 1600 may include other elements, such as an upper 1602, and additional materials or layers, such as an outsole 1604 and/or an insole 1606. Additional layers may provide a seventh custom sole structure 1608 with further cushioning and/or support.

Other embodiments or variations of custom sole structures may include other lattice structure designs or various combinations of the above-disclosed designs. It should be noted that the present description is not limited to lattice structures having the geometry of first lattice structure 602, second lattice structure 1002, and third lattice structure 1402. In other words, the custom sole structures depicted herein are merely intended to provide an example of the many types of lattice structure configurations that fall within the scope of the present discussion.

While various embodiments have been described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

What is claimed is:

1. A sole structure for an article of footwear, the sole structure comprising:
    a forefoot region;
    a heel region;
    a midfoot region disposed between the forefoot region and the heel region;
    a structure extending between the forefoot region and the heel region and defining a first surface, a second surface formed on an opposite side of the structure from the first surface, a medial side, a lateral side, and a plurality of apertures each defined by a wall extending from the first surface to the second surface of the structure, the apertures tapering in width along a first direction from the first surface to the second surface whereby walls defining adjacent ones of the apertures are joined at the first surface and diverge from each other along the first direction, the plurality of apertures including apertures that extend from the medial side to the lateral side along a first longitudinal axis to define a first pattern of apertures that is repeated along a second longitudinal axis, perpendicular to the first longitudinal axis, across an entire length of the structure from the forefoot region to the heel region; and
    a plurality of discrete spherical cushioning elements each disposed in respective ones of the plurality of apertures and having an outer perimeter supported by the wall of the respective aperture in which the cushioning element is disposed such that a portion of each of the cushioning elements is spaced apart from the wall and protrudes from the first surface of the structure.

2. The sole structure of claim 1, wherein the cushioning elements are fluid-filled chambers.

3. The sole structure of claim 1, wherein the cushioning elements are air-filled chambers.

4. An article of footwear incorporating the sole structure of claim 1.

5. The sole structure of claim 1, wherein the cushioning elements are spherical.

6. The sole structure of claim 1, wherein plurality of apertures are circular.

7. The sole structure of claim 1, wherein the plurality of apertures include a constant taper from the first surface to the second surface.

8. An article of footwear incorporating the sole structure of claim 1.

9. The sole structure of claim 1, wherein the first surface of the structure is an upper surface for receiving a plantar surface of a foot.

10. The sole structure of claim 1, wherein the structure includes a peripheral side extending between and bounding the first surface and the second surface, the peripheral side including a plurality of perforations formed therethrough.

11. The sole structure of claim 10, wherein the perforations are polygonal.

12. The sole structure of claim 1, wherein the first pattern is a row of apertures extending from the medial side to the lateral side, the row of apertures repeated along the second longitudinal axis to define a plurality of columns of the apertures extending from the forefoot region to the heel region.

\* \* \* \* \*